(12) United States Patent
Nakamura et al.

(10) Patent No.: US 7,830,614 B2
(45) Date of Patent: Nov. 9, 2010

(54) ZOOM LENS SYSTEM AND ELECTRONIC IMAGING APPARATUS THAT USES THE SAME

(75) Inventors: Toshiki Nakamura, Saitama (JP); Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/412,596

(22) Filed: Mar. 27, 2009

(65) Prior Publication Data

US 2009/0244719 A1  Oct. 1, 2009

(30) Foreign Application Priority Data

Mar. 31, 2008 (JP) ............................... 2008-089398

(51) Int. Cl.
 *G02B 15/14* (2006.01)
(52) U.S. Cl. ...................................... 359/689; 359/683
(58) Field of Classification Search ......... 359/682–684, 359/686, 689, 676
 See application file for complete search history.

(56) References Cited

U.S. PATENT DOCUMENTS

| 6,515,804 B2 * | 2/2003 | Watanabe et al. ............ 359/689 |
| 6,597,513 B2 * | 7/2003 | Minefuji ...................... 359/689 |
| 7,529,037 B2 * | 5/2009 | Katakura ..................... 359/689 |
| 2005/0036209 A1 | 2/2005 | Iwasawa et al. |
| 2005/0046959 A1 | 3/2005 | Katakura et al. |
| 2005/0057817 A1 | 3/2005 | Ori |
| 2005/0254143 A1 | 11/2005 | Saito et al. |
| 2006/0262423 A1 | 11/2006 | Kiyotoshi |
| 2008/0158690 A1 | 7/2008 | Eguchi |
| 2009/0034090 A1 | 2/2009 | Eguchi |
| 2009/0034092 A1 | 2/2009 | Eguchi |

FOREIGN PATENT DOCUMENTS

| JP | 2005-37727 | 2/2005 |
| JP | 2005-70696 | 3/2005 |
| JP | 2005-70697 | 3/2005 |
| JP | 2005-84597 | 3/2005 |
| JP | 2006-301154 | 11/2006 |

OTHER PUBLICATIONS

English language Abstract of JP 2005-37727, Feb. 10, 2005.
English language Abstract of JP 2005-70696, Mar. 17, 2005.
English language Abstract of JP 2005-70697, Mar. 17, 2005.
English language Abstract of JP 2005-84597, Mar. 31, 2005.
English language Abstract of JP 2006-301154, Nov. 2, 2006.
U.S. Appl. No. 12/430,355 to Nakamura et al., filed Apr. 27, 2009.

* cited by examiner

*Primary Examiner*—Darryl J Collins
*Assistant Examiner*—Zachary Wilkes
(74) *Attorney, Agent, or Firm*—Greenblum & Bernstein, P.L.C.

(57) ABSTRACT

A zoom lens system includes a negative first lens group, a positive second lens group, and a positive third lens group. Upon zooming from the short focal length extremity to the long focal length extremity, each of the first to third lens groups move along the optical axis. The first lens group includes a negative first sub-lens element, a second sub-lens element having a weak negative refractive power and at least one aspherical surface, and a positive third sub-lens element. The zoom lens system satisfies the condition, $$0.5 < (ra-rb)/(ra+rb) < 1.2 \qquad (1),$$

where ra designates the radius of curvature of the object-side surface of the second sub-lens element and rb designates the radius of curvature of the image-side surface of the second sub-lens element.

15 Claims, 15 Drawing Sheets

Fno=1:2.6

— d Line
······ g Line
---- C Line

-0.2  0.2
SPHERICAL ABERRATION
CHROMATIC ABERRATION

W=41.4

-0.01  0.01
LATERAL CHROMATIC ABERRATION

W=41.4

— S
-- M

-0.1  0.1
ASTIGMATISM

W=41.4

-10(%) 10
DISTORTION

Fno=1: 3.7

— d Line
······ g Line
---- C Line

-0.2  0.2
SPHERICAL
ABERRATION

CHROMATIC
ABERRATION

W=22.6

-0.01  0.01
LATERAL
CHROMATIC
ABERRATION

W=22.6

— S
-- M

-0.1  0.1
ASTIGMATISM

W=22.6

-10 (%) 10
DISTORTION

Fno=1: 6.1

— d Line
······ g Line
---- C Line

-0.2  0.2
SPHERICAL
ABERRATION

CHROMATIC
ABERRATION

W=11.5

-0.01  0.01
LATERAL
CHROMATIC
ABERRATION

W=11.5

— S
-- M

-0.1  0.1
ASTIGMATISM

W=11.5

-10 (%) 10
DISTORTION

Fig. 5
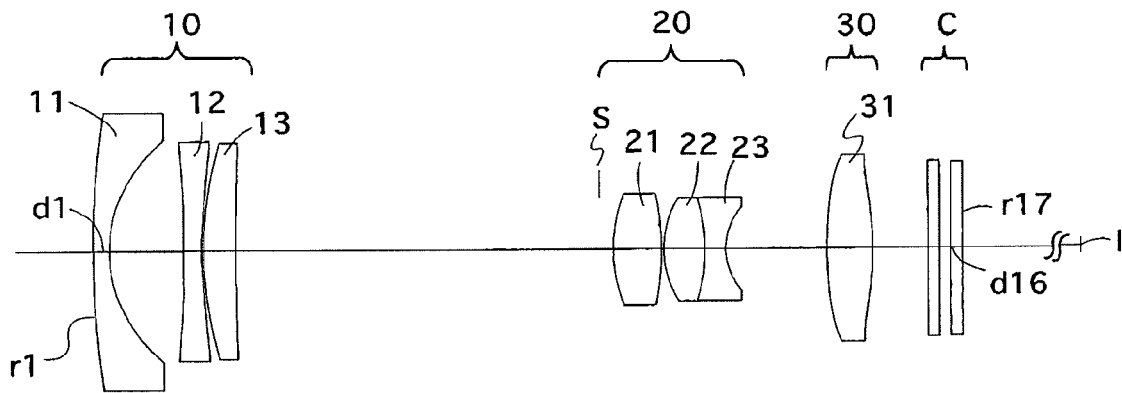
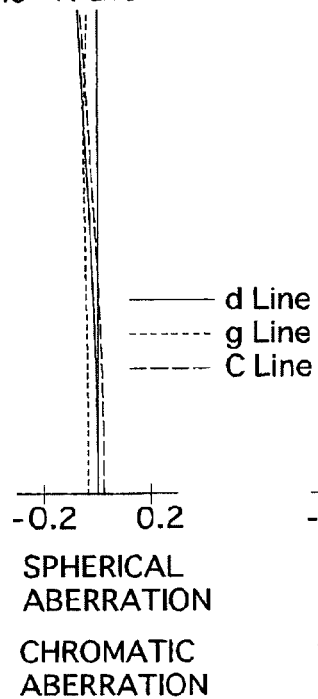
Fig. 6A
Fno=1: 2.6
— d Line
--- g Line
----- C Line
-0.2  0.2
SPHERICAL
ABERRATION
CHROMATIC
ABERRATION
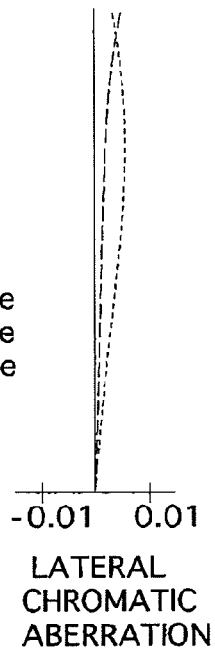
Fig. 6B
W= 42.0
-0.01  0.01
LATERAL
CHROMATIC
ABERRATION
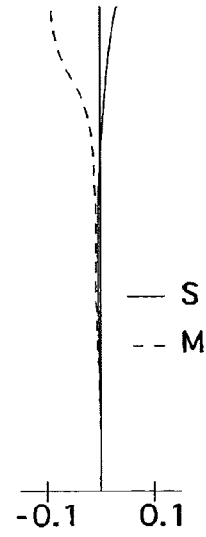
Fig. 6C
W= 42.0
— S
-- M
-0.1  0.1
ASTIGMATISM
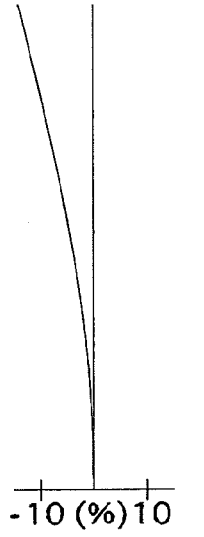
Fig. 6D
W= 42.0
-10 (%) 10
DISTORTION

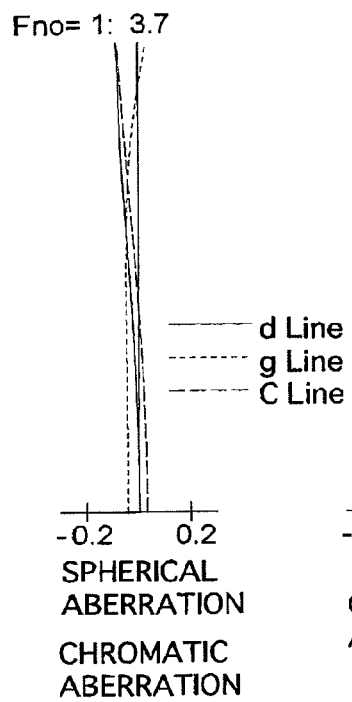
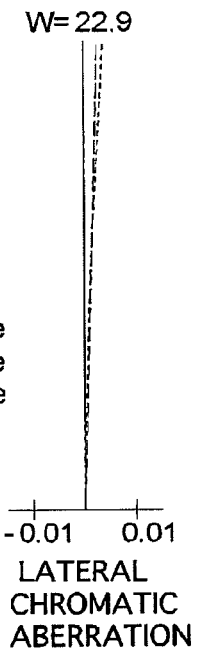
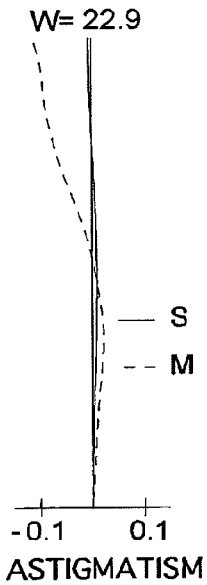
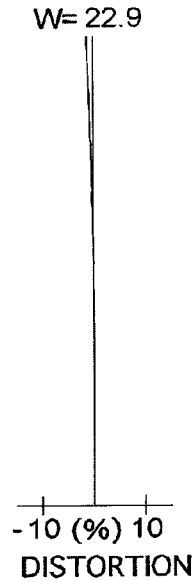
Fig. 7A  Fno= 1: 3.7  SPHERICAL ABERRATION CHROMATIC ABERRATION
Fig. 7B  W= 22.9  LATERAL CHROMATIC ABERRATION
Fig. 7C  W= 22.9  ASTIGMATISM
Fig. 7D  W= 22.9  DISTORTION
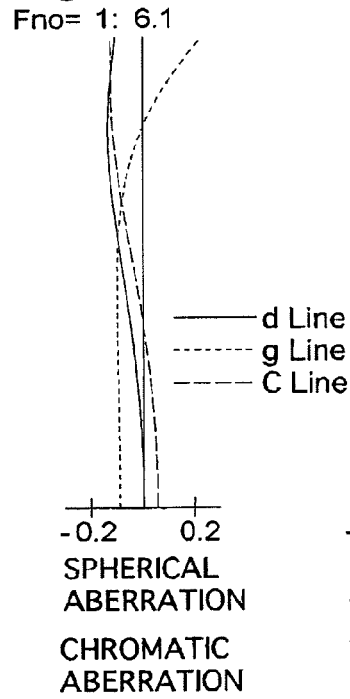
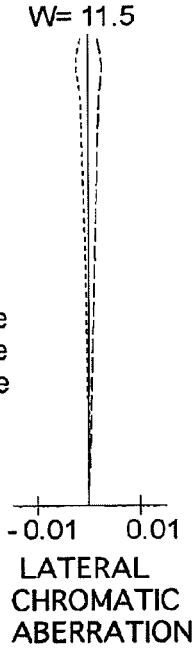
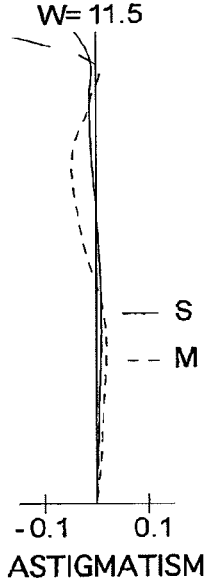
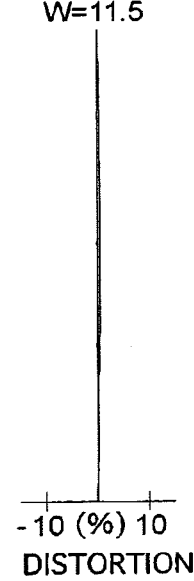
Fig. 8A  Fno= 1: 6.1  SPHERICAL ABERRATION CHROMATIC ABERRATION
Fig. 8B  W= 11.5  LATERAL CHROMATIC ABERRATION
Fig. 8C  W= 11.5  ASTIGMATISM
Fig. 8D  W=11.5  DISTORTION Fig.9
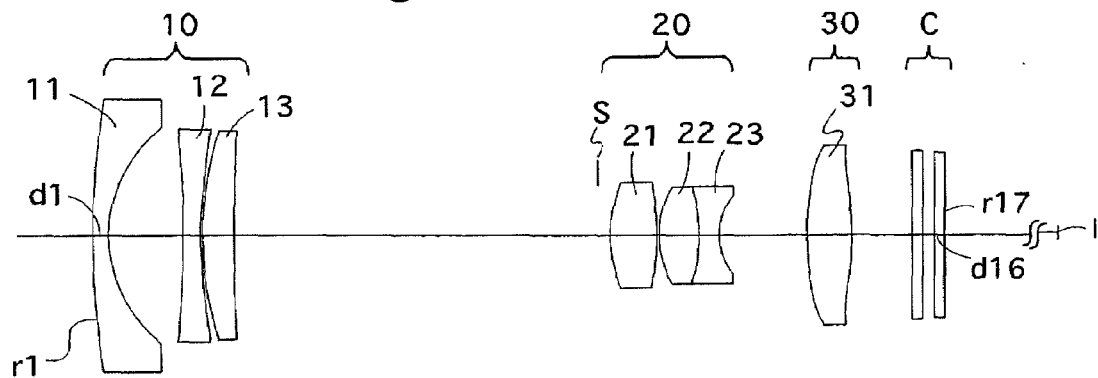
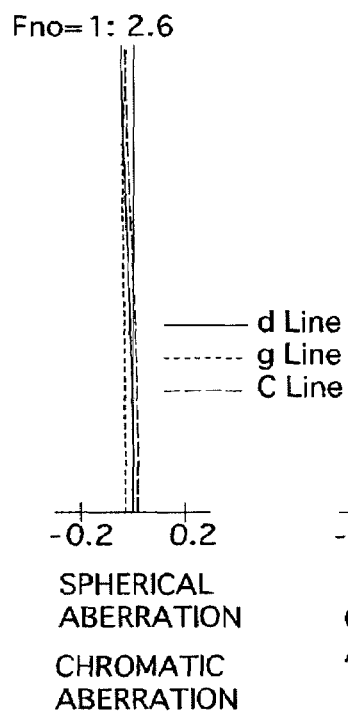
Fig. 10A
Fno=1:2.6
—— d Line
------ g Line
—-— C Line
-0.2  0.2
SPHERICAL
ABERRATION
CHROMATIC
ABERRATION
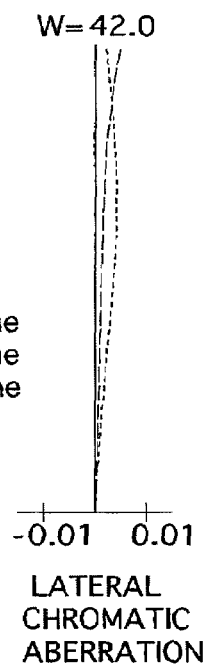
Fig. 10B
W=42.0
-0.01  0.01
LATERAL
CHROMATIC
ABERRATION
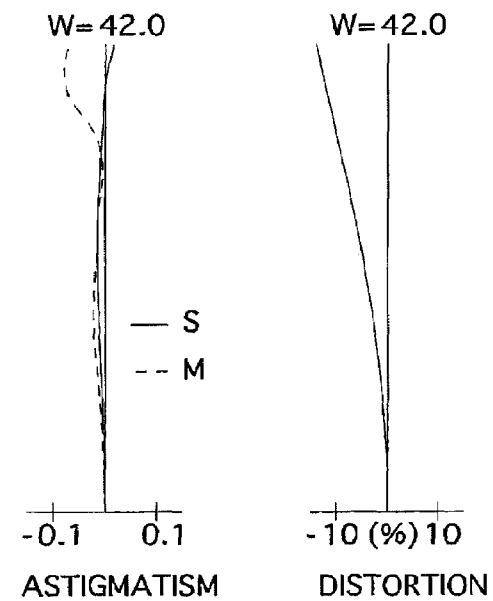
Fig. 10C
W=42.0
—— S
-- M
-0.1  0.1
ASTIGMATISM
Fig. 10D
W=42.0
-10 (%) 10
DISTORTION

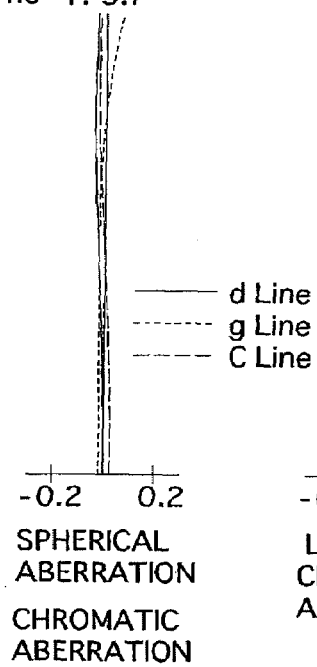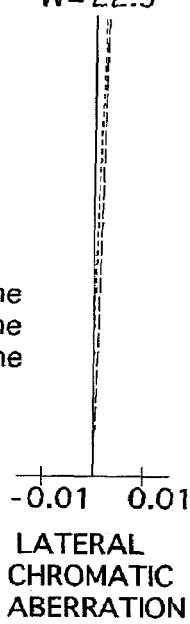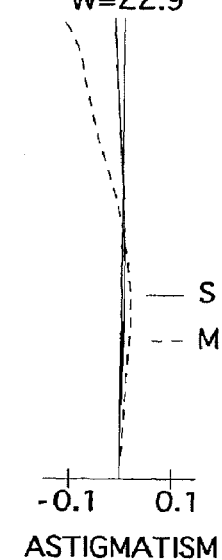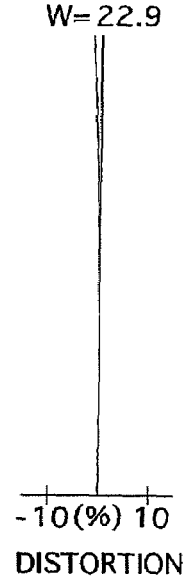
Fig. 11A Fno=1:3.7 — SPHERICAL ABERRATION CHROMATIC ABERRATION (d Line, g Line, C Line), -0.2 to 0.2
Fig. 11B W=22.9 — LATERAL CHROMATIC ABERRATION, -0.01 to 0.01
Fig. 11C W=22.9 — ASTIGMATISM (S, M), -0.1 to 0.1
Fig. 11D W=22.9 — DISTORTION, -10(%) to 10
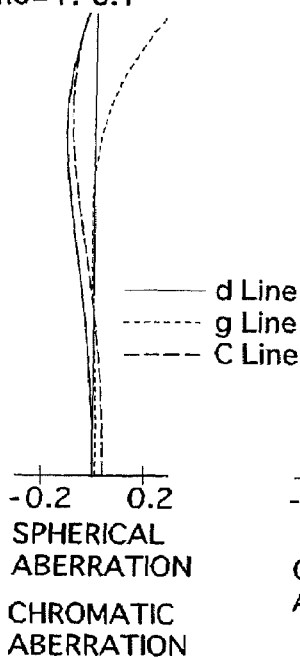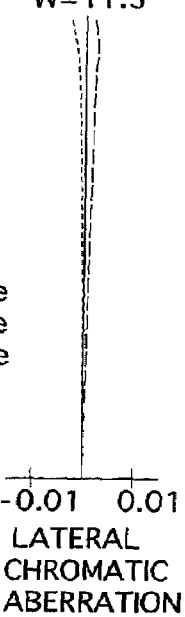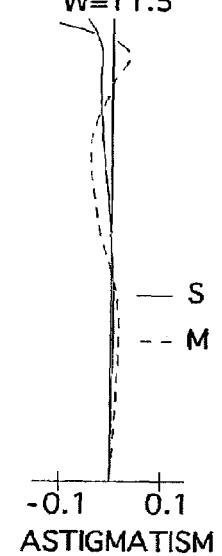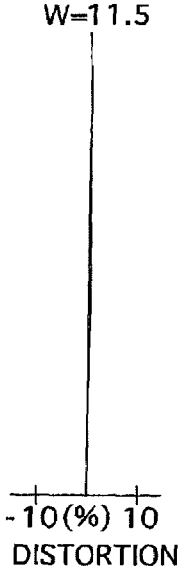
Fig. 12A Fno=1:6.1 — SPHERICAL ABERRATION CHROMATIC ABERRATION (d Line, g Line, C Line), -0.2 to 0.2
Fig. 12B W=11.5 — LATERAL CHROMATIC ABERRATION, -0.01 to 0.01
Fig. 12C W=11.5 — ASTIGMATISM (S, M), -0.1 to 0.1
Fig. 12D W=11.5 — DISTORTION, -10(%) to 10

Fig. 13
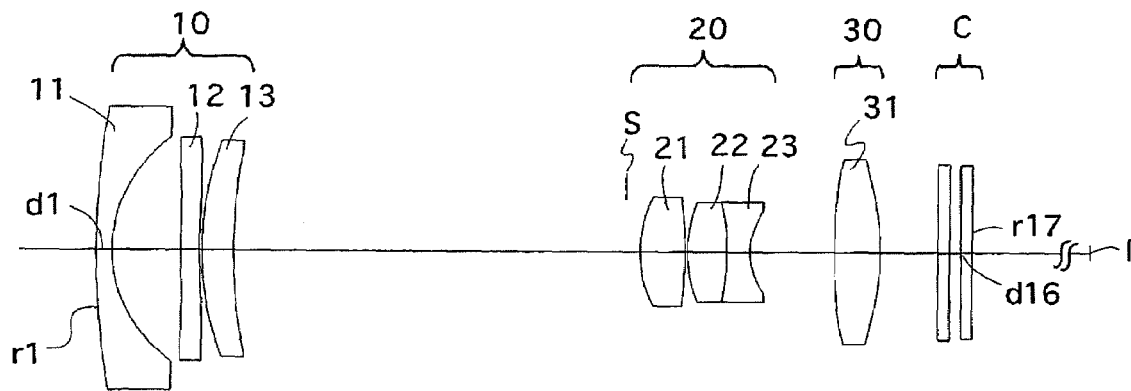
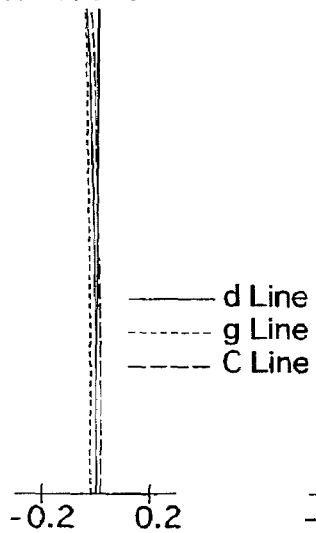
Fig. 14A
Fno=1: 2.6
——— d Line
-------- g Line
— — — C Line
-0.2  0.2
SPHERICAL
ABERRATION
CHROMATIC
ABERRATION
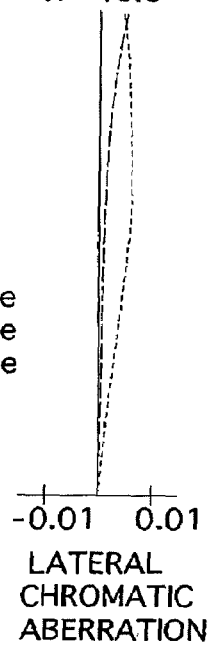
Fig. 14B
W= 40.5
-0.01  0.01
LATERAL
CHROMATIC
ABERRATION
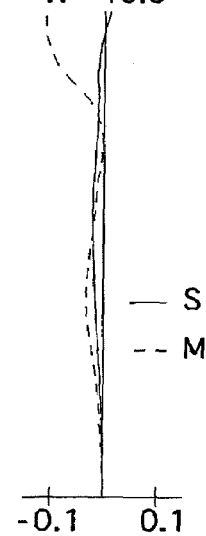
Fig. 14C
W= 40.5
——— S
-- - M
-0.1  0.1
ASTIGMATISM
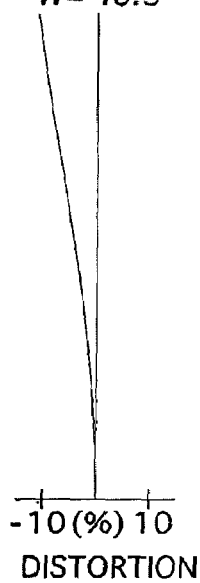
Fig. 14D
W= 40.5
-10(%) 10
DISTORTION Fno=1: 3.5

-0.2  0.2
SPHERICAL ABERRATION
CHROMATIC ABERRATION

— d Line
----- g Line
--- C Line

W=24.4

-0.01  0.01
LATERAL CHROMATIC ABERRATION

W=24.4

-0.1  0.1
ASTIGMATISM

— S
-- M

W=24.4

-10 (%) 10
DISTORTION

Fno=1: 5.9

-0.2  0.2
SPHERICAL ABERRATION
CHROMATIC ABERRATION

— d Line
----- g Line
--- C Line

W=11.8

-0.01  0.01
LATERAL CHROMATIC ABERRATION

W=11.8

-0.1  0.1
ASTIGMATISM

— S
-- M

W=11.8

-10 (%) 10
DISTORTION

Fig.17
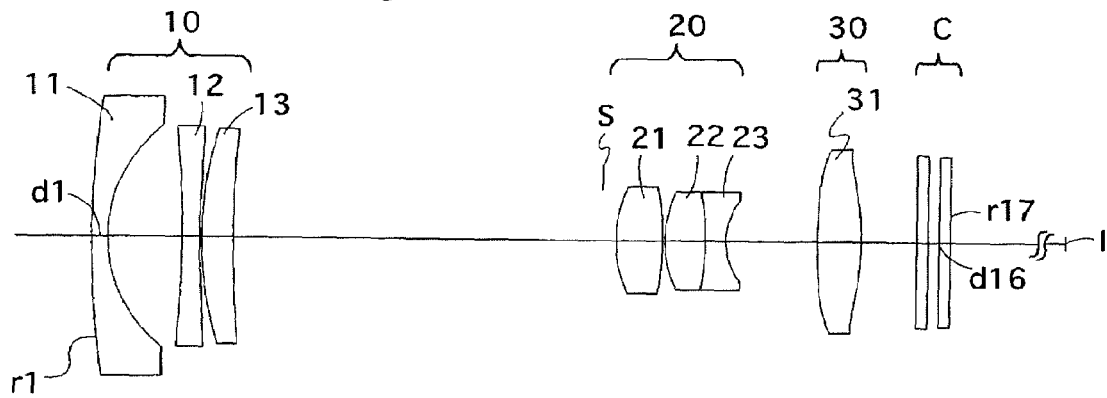
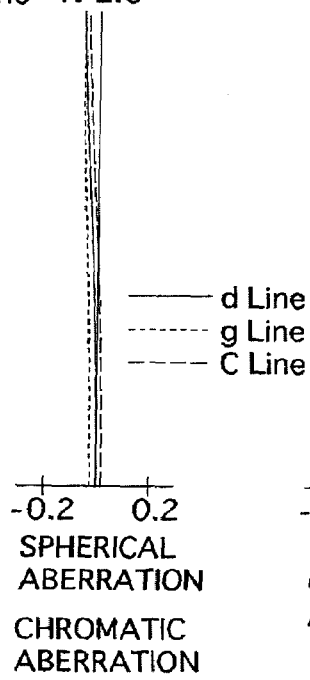
Fig. 18A
Fno=1: 2.6
—— d Line
- - - - g Line
— — — C Line
-0.2  0.2
SPHERICAL
ABERRATION
CHROMATIC
ABERRATION
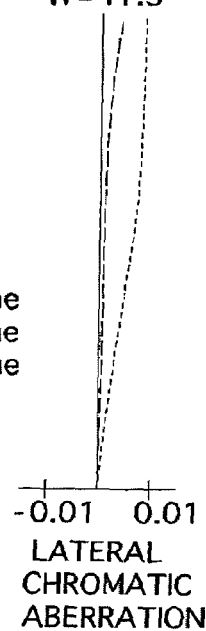
Fig. 18B
W=41.3
-0.01  0.01
LATERAL
CHROMATIC
ABERRATION
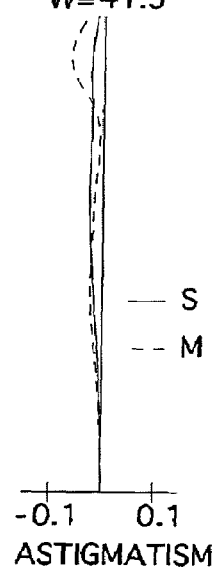
Fig. 18C
W=41.3
—— S
- - M
-0.1  0.1
ASTIGMATISM
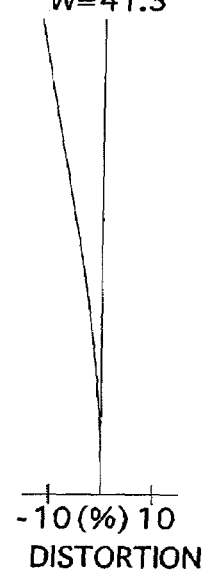
Fig. 18D
W=41.3
-10(%) 10
DISTORTION Fno= 1: 3.7

-0.2   0.2
SPHERICAL
ABERRATION

CHROMATIC
ABERRATION

——— d Line
········· g Line
- - - - C Line

W=22.8

-0.01   0.01
LATERAL
CHROMATIC
ABERRATION

W=22.8

-0.1   0.1
ASTIGMATISM

——— S
- - M

W=22.8

-10 (%) 10
DISTORTION

Fno=1: 5.9

-0.2   0.2
SPHERICAL
ABERRATION

CHROMATIC
ABERRATION

——— d Line
········· g Line
- - - - C Line

W=12.0

-0.01   0.01
LATERAL
CHROMATIC
ABERRATION

W=12.0

-0.1   0.1
ASTIGMATISM

——— S
- - M

W=12.0

-10 (%) 10
DISTORTION

Fno=1:2.6

−0.2  0.2
SPHERICAL
ABERRATION
CHROMATIC
ABERRATION

— d Line
····· g Line
---- C Line

W=40.5

−0.01  0.01
LATERAL
CHROMATIC
ABERRATION

W=40.5

−0.1  0.1
ASTIGMATISM

— S
-- M

W=40.5

−10 (%) 10
DISTORTION

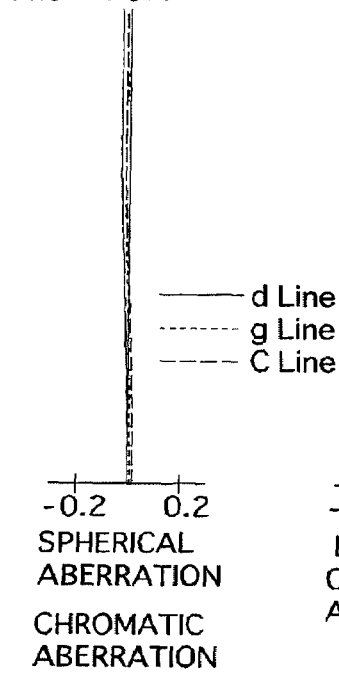
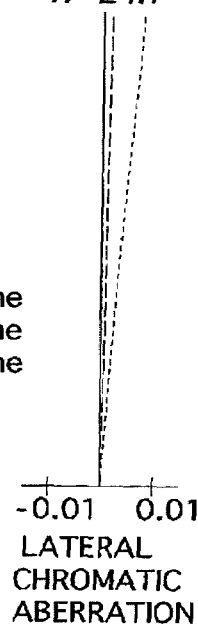
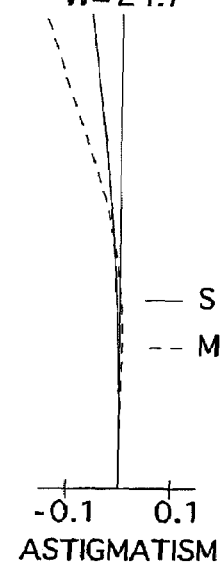
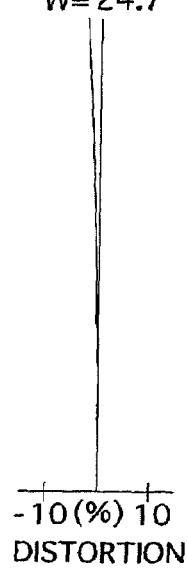
Fig. 23A  Fno=1: 3.6  SPHERICAL ABERRATION CHROMATIC ABERRATION
Fig. 23B  W=24.7  LATERAL CHROMATIC ABERRATION
Fig. 23C  W=24.7  ASTIGMATISM
Fig. 23D  W=24.7  DISTORTION
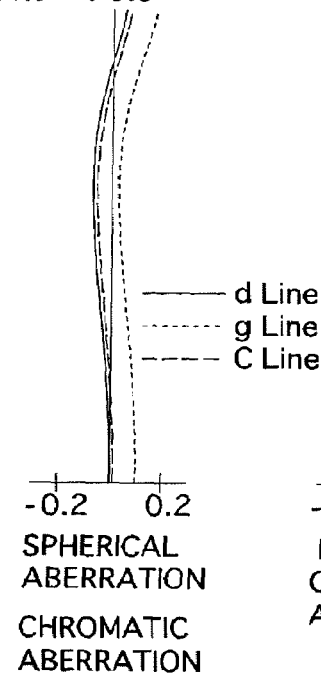
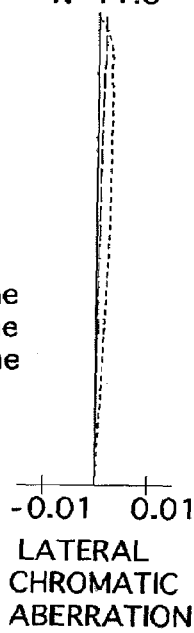
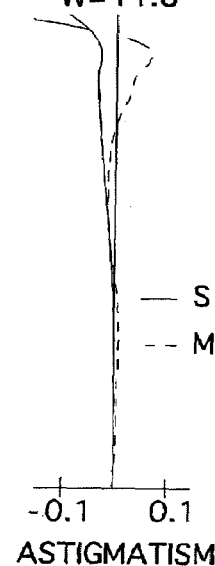
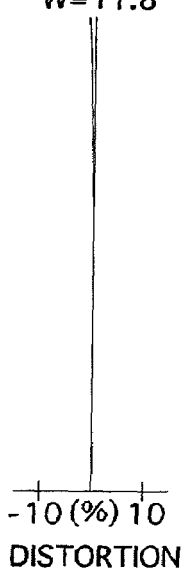
Fig. 24A  Fno=1: 5.9  SPHERICAL ABERRATION CHROMATIC ABERRATION
Fig. 24B  W=11.8  LATERAL CHROMATIC ABERRATION
Fig. 24C  W=11.8  ASTIGMATISM
Fig. 24D  W=11.8  DISTORTION Fno= 1: 2.6

-0.2   0.2
SPHERICAL
ABERRATION
CHROMATIC
ABERRATION

—— d Line
------ g Line
----- C Line

W= 39.6

-0.01   0.01
LATERAL
CHROMATIC
ABERRATION

W= 39.6

-0.1   0.1
ASTIGMATISM

—— S
-- M

W= 39.6

-10 (%) 10
DISTORTION

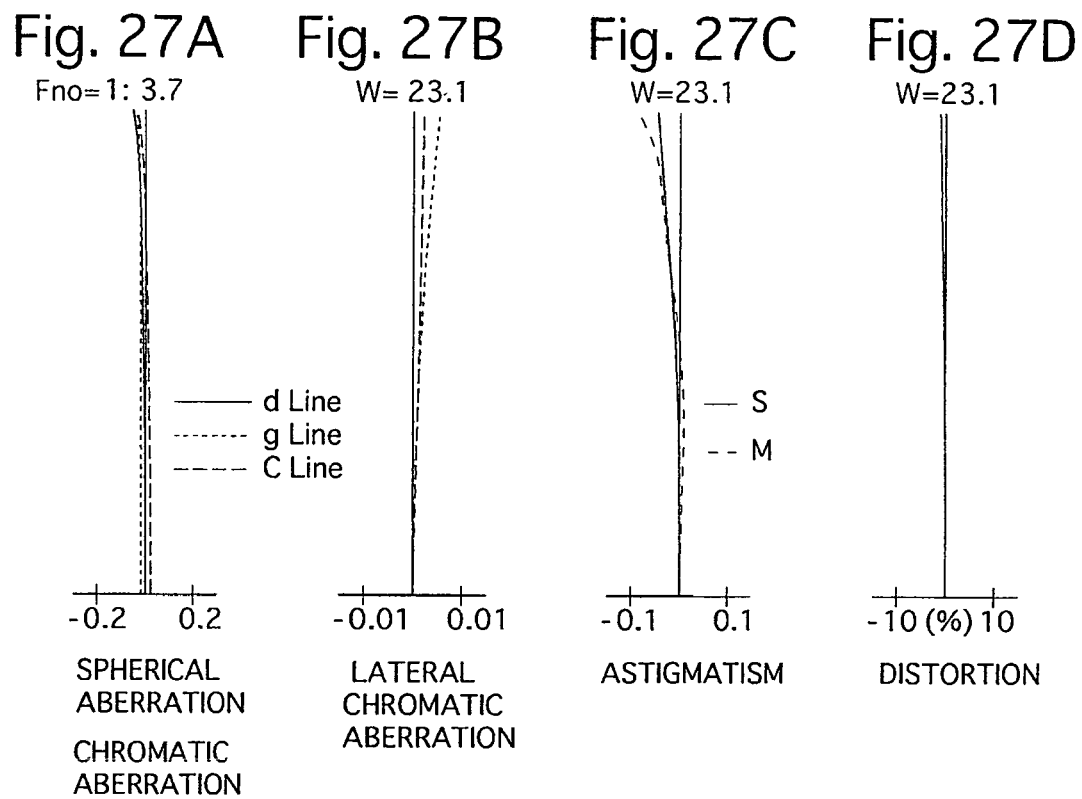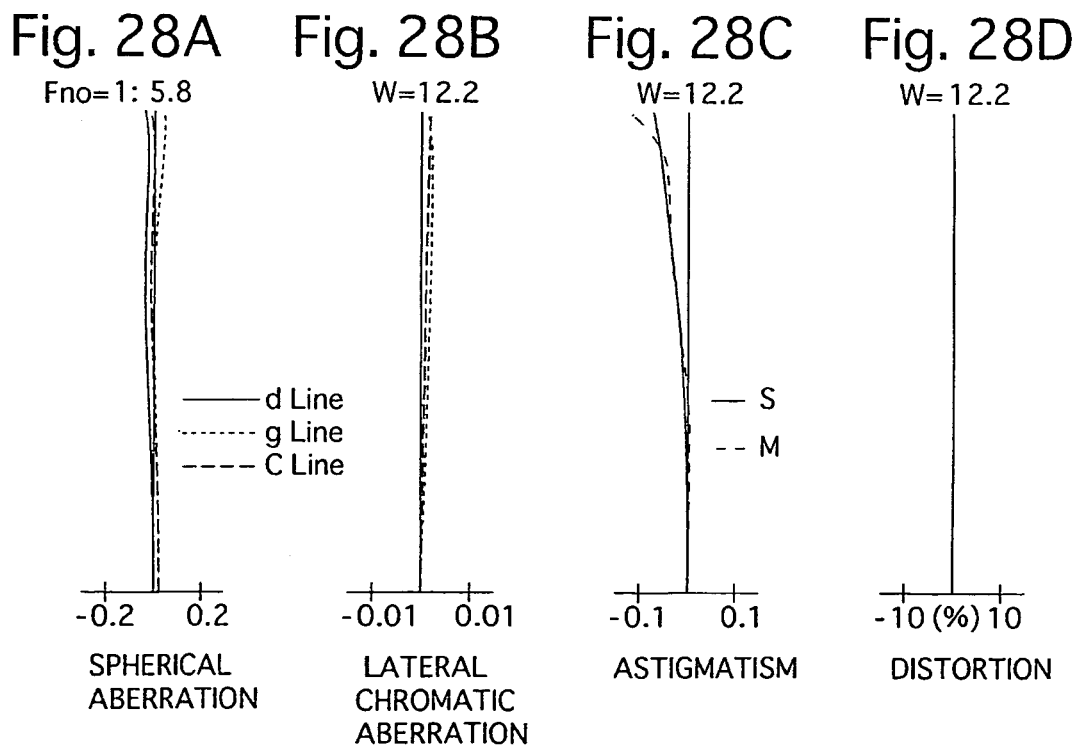

ZOOM LENS SYSTEM AND ELECTRONIC IMAGING APPARATUS THAT USES THE SAME

BACKGROUND OF THE INVENTION

1. Field of the Invention

The present invention relates to a zoom lens system having a wide angle-of-view of approximately 80° at the short focal length extremity and having a zoom ratio of approximately 4, to be used in a light-weight, compact digital camera. The present invention also relates to an electronic imaging apparatus which uses such a zoom lens system.

2. Description of Related Art

In recent years, further miniaturization of digital compact cameras due to further miniaturization of electronic components has been progressing, and further miniaturization of the photographing optical system is also in demand. On the other hand, in order to further enhance the added value of a camera, there is also a high demand to increase both the angle-of-view and the zoom ratio, which tend to increase the size of the optical system. Accordingly, it is a challenging problem to achieve the best possible balance between miniaturization and high specifications.

A negative-lead type lens system is often used in a zoom lens system having a zoom ratio of approximately 3 as a zoom lens system for a compact digital camera. Since a negative-lead type lens system can widen the angle-of-view at the short focal length extremity and miniaturize the lens system, especially the diameter of the most object-side lens group, the negative-lead type lens system is suitable for the so-called retractable zoom lens camera in which the lens groups are accommodated by reducing the distances therebetween when the lens groups are being retracted to an accommodating position.

Furthermore, due to the need to position the exit pupil sufficiently far away from the imaging plane, a three-lens-group zoom lens system, i.e., a first lens group having a negative refractive power (hereinafter, a negative first lens group), a second lens group having a positive refractive power (hereinafter, a positive second lens group) and a third lens group having a positive refractive power (hereinafter, a positive third lens group) is often employed (e.g., Japanese Unexamined Patent Publication Nos. 2005-70696 and 2005-37727).

In the case of a zoom lens system having a zoom ratio of 4 or more, a positive-lead lens system is often employed.

Such a positive-lead type zoom lens system is suitable for reducing the overall length of the zoom lens system; however, the diameter of the first lens group (the most object-side lens group) is very large, which is not suitable for the so-called retractable zoom lens camera having a multi-stage retractable lens barrel.

In the aforementioned Japanese Unexamined Patent Publication Nos. 2005-70696 and 2005-37727, relatively small optical systems having a zoom ratio of approximately 3 are disclosed; however, the optical systems disclosed therein do not attain a sufficient zoom ratio, and do not achieve a sufficient reduction in costs.

Generally, a negative-lead type lens system is desirable for a camera with a retractable zoom lens system. However, if the zoom ratio is increased up to approximately 4, the overall length of the zoom lens system tends to increase, and the correcting of aberrations becomes more difficult.

If attempts are made to suitably correct aberrations without increasing the size of the zoom lens system, the number of lens elements are increased. A large number of aspherical surfaces can correct aberrations; however, such an optical arrangement incurs a substantial increase in cost.

SUMMARY OF THE INVENTION

The present invention provides a negative-lead type zoom lens system which includes three lens groups, and has a zoom ratio of approximately 4 can suitably correct aberrations, and can cover a zooming range from the wide-angle extremity (the short focal length extremity) to the telephoto extremity (the long focal length extremity).

According to a first aspect of the present invention, there is provided a zoom lens system including a negative first lens group, a positive second lens group, and a positive third lens group, in this order from the object.

Upon zooming from the short focal length extremity to the long focal length extremity, each of the negative first lens group, the positive second lens group and the positive third lens group moves along the optical axis.

The negative first lens group includes a negative first sub-lens element, a second sub-lens element having a negative and weak refractive power and at least one aspherical surface, and a positive third sub-lens element, in this order from the object.

The zoom lens system satisfies the following condition:

$$0.5 < (ra-rb)/(ra+rb) < 1.2 \quad (1)$$

wherein ra designates the radius of curvature of the object-side surface of the second sub-lens element of the negative first lens group; and rb designates the radius of curvature of the image-side surface of the second sub-lens element of the negative first lens group.

According to a second aspect of the present invention, there is provided a zoom lens system including a negative first lens group, a positive second lens group, and a positive third lens group, in this order from the object.

Upon zooming from the short focal length extremity to the long focal length extremity, the negative first lens group first moves toward an image, and thereafter moves toward the object, the positive second lens group moves monotonically toward the object, and the positive third lens group moves monotonically toward the image; and wherein the zoom lens system satisfies the following condition:

$$0.5 < f2/f3 < 0.9 \quad (2)$$

wherein f2 designates the focal length of the positive second lens group; and f3 designates the focal length of the positive third lens group.

According to a third aspect of the present invention, there is provided a zoom lens system including a negative first lens group, a positive second lens group, and a positive third lens group, in this order from the object.

Upon zooming from the short focal length extremity to the long focal length extremity, each of the negative first lens group, the positive second lens group and the positive third lens group moves along the optical axis.

The positive second lens group includes a positive fourth sub-lens element having at least one aspherical surface, a positive fifth sub-lens element, and a negative sixth sub-lens element, in this order from the object.

The zoom lens system satisfies the following condition:

$$v2-1 > 60 \quad (3)$$

wherein

μ2-1 designates the Abbe number of the positive fourth sub-lens element of the positive second lens group.

According to a fourth aspect of the present invention, there is provided a zoom lens system including a negative first lens group, a positive second lens group, and a positive third lens group, in this order from the object.

Upon zooming from the short focal length extremity to the long focal length extremity, each of the negative first lens group, the positive second lens group and the positive third lens group moves along the optical axis.

The positive second lens group moves monotonically toward the object, and the positive third lens group moves monotonically toward the image.

The zoom lens system satisfies the following condition:

$$3.2 < m2t/m2w < 4.0 \quad (4)$$

$$1.05 < m3t/m3w < 1.4 \quad (5)$$

Wherein m2t designates the image-forming magnification of the positive second lens group at the long focal length extremity when the object at infinity is in an in-focus state;

m2w designates the image-forming magnification of the positive second lens group at the short focal length extremity when the object at infinity is in an in-focus state;

m3t designates the image-forming magnification of the positive third lens group at the long focal length extremity when the object at infinity is in an in-focus state; and m3w designates the image-forming magnification of the positive third lens group at the short focal length extremity when the object at infinity is in an in-focus state.

Not only in the first fourth aspect of the present invention, but also in the second to the fourth aspects thereof, the negative first lens group includes a negative first sub-lens element, a second sub-lens element having a negative and weak refractive power and at least one aspherical surface, and a positive third sub-lens element, in this order from the object.

The negative first lens group satisfies the following condition:

$$v1-3 < 23 \quad (6)$$

wherein v1-3 designates the Abbe number of the positive third sub-lens element of the negative first lens group.

In the fourth aspect of the present invention, the second sub-lens element of the negative first lens group satisfies the following condition:

$$0.5 < (ra-rb)/(ra+rb) < 1.2 \quad (1)$$

wherein ra designates the radius of curvature of the object-side surface of the second sub-lens element of the negative first lens group; and rb designates the radius of curvature of the image-side surface of the second sub-lens element of the negative first lens group.

Furthermore, the zoom lens system preferably satisfies the following condition:

$$0.5 < f2/f3 < 0.9 \quad (2)$$

wherein f2 designates the focal length of the positive second lens group; and f3 designates the focal length of the positive third lens group.

The positive fourth sub-lens element of the positive second lens group is preferably made aspherical on both lens surfaces.

The positive third lens group is practically constituted by a biconvex lens element that is made from resin, and functions as a focusing lens group.

According to another aspect of the present invention, there is provided an electronic imaging apparatus including an imaging device on which an image is formed by the zoom lens system according.

The present disclosure relates to subject matter contained in Japanese Patent Application No. 2008-89398 (filed on Mar. 31, 2008) which is expressly incorporated herein in its entirety.

BRIEF DESCRIPTION OF THE DRAWINGS

The present invention will be discussed below in detail with reference to the accompanying drawings, in which:

FIG. 5 shows a lens arrangement of a second embodiment of the zoom lens system according to the present invention;

FIGS. 6A, 6B, 6C and 6D show aberrations occurred in the lens arrangement shown in FIG. 5 at the short focal length extremity when an object at infinity is photographed;

FIGS. 7A, 7B, 7C and 7D show aberrations occurred in the lens arrangement shown in FIG. 5 at an intermediate focal length when an object at infinity is photographed;

FIGS. 8A, 8B, 8C and 8D show aberrations occurred in the lens arrangement shown in FIG. 5 at the long focal length extremity when an object at infinity is photographed;

FIG. 9 shows a lens arrangement of a third embodiment of the zoom lens system according to the present invention;

FIGS. 10A, 10B, 10C and 10D show aberrations occurred in the lens arrangement shown in FIG. 9 at the short focal length extremity when an object at infinity is photographed;

FIGS. 11A, 11B, 11C and 11D show aberrations occurred in the lens arrangement shown in FIG. 9 at an intermediate focal length when an object at infinity is photographed;

FIGS. 12A, 12B, 12C and 12D show aberrations occurred in the lens arrangement shown in FIG. 9 at the long focal length extremity when an object at infinity is photographed;

FIG. 13 shows a lens arrangement of a fourth embodiment of the zoom lens system according to the present invention;

FIGS. 14A, 14B, 14C and 14D show aberrations occurred in the lens arrangement shown in FIG. 13 at the short focal length extremity when an object at infinity is photographed;

FIG. 17 shows a lens arrangement of a fifth embodiment of the zoom lens system according to the present invention;

FIGS. 18A, 18B, 18C and 18D show aberrations occurred in the lens arrangement shown in FIG. 17 at the short focal length extremity when an object at infinity is photographed;

FIGS. 23A, 23B, 23C and 23D show aberrations occurred in the lens arrangement shown in FIG. 21 at an intermediate focal length when an object at infinity is photographed;

FIGS. 24A, 24B, 24C and 24D show aberrations occurred in the lens arrangement shown in FIG. 21 at the long focal length extremity when an object at infinity is photographed;

FIGS. 27A, 27B, 27C and 27D show aberrations occurred in the lens arrangement shown in FIG. 25 at an intermediate focal length when an object at infinity is photographed;

FIGS. 28A, 28B, 28C and 28D show aberrations occurred in the lens arrangement shown in FIG. 25 at the long focal length extremity when an object at infinity is photographed.

DESCRIPTION OF THE PREFERRED EMBODIMENTS

Figure 29:
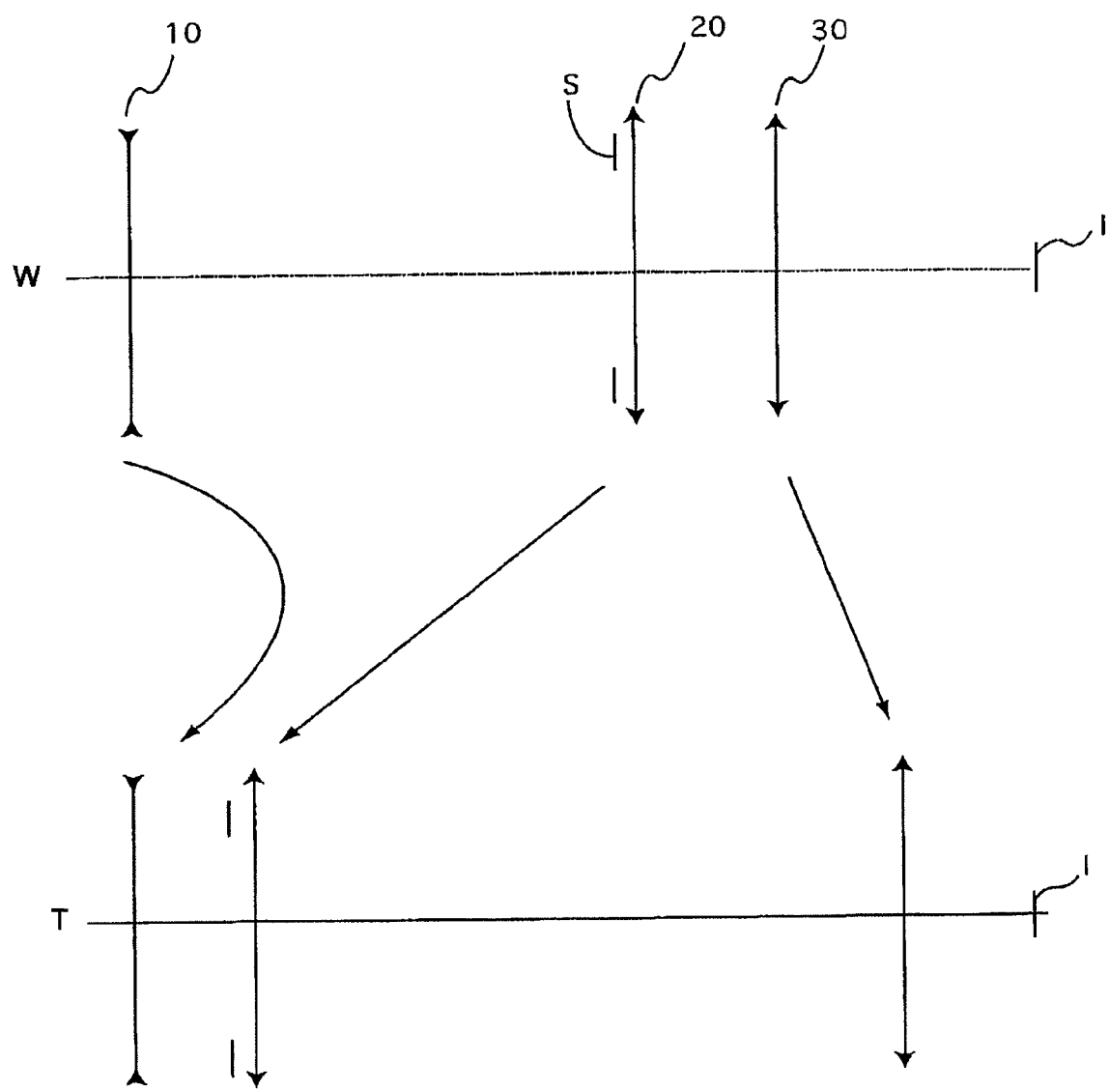
FIG. 29 is a schematic lens-group moving paths of the zoom lens system, according to the present invention.

The zoom lens system of the present invention, as shown in the schematic lens-group moving paths of FIG. 29, includes a negative first lens group 10, a positive second lens group 20, and a positive third lens group 30, in this order from the object.

Upon zooming from the short focal length extremity (W) to the long focal length extremity (T), each of the negative first lens group 10, the positive second lens group 20 and the positive third lens group 30 moves along the optical axis.

More specifically, upon zooming from the short focal length extremity to the long focal length extremity, the negative first lens group 10 first moves toward the image, and thereafter moves toward the object; the positive second lens group 20 moves monotonically toward the object; and the positive third lens group 30 moves monotonically toward the image.

A diaphragm S is provided between the negative first lens group 10 and the positive second lens group 20, and moves together with the positive second lens group 20 upon zooming.

Focusing is carried out by the positive third lens group 30.

The designator 'I' designates an image plane.

Due to the above-explained lens-group arrangement, by performing zooming by moving each of the three lens groups, i.e., the negative first lens group 10, the positive second lens group 20 and the positive third lens group 30 in the above-described manner, a higher zoom ratio can be achieved.

As shown in each of the embodiments of FIGS. 1, 5, 9, 13, 17, 21 and 25, the negative first lens group 10 includes a negative first sub-lens element 11, a second sub-lens element 12 having a weak negative refractive power and at least one aspherical surface, and a positive third sub-lens element 13, in this order from the object; the positive second lens group 20 includes a positive fourth sub-lens element 21 having at least one aspherical surface, a positive fifth sub-lens element 22, and a negative sixth sub-lens element 23 having a concave surface toward the image, in this order from the object; and the third lens group 30 includes a positive single biconvex lens element 31; and a cover glass (filter group) C is provided in front of an imaging device.

Due to the lens arrangement of the negative first lens group 10, i.e., the negative first sub-lens element 11, the second sub-lens element 12 having a weak negative refractive power and at least one aspherical surface, and the positive third sub-lens element 13, in this order from the object, the correcting of aberrations can suitably be made.

Condition (1) relates to the shape of the second sub-lens element 12 of the negative first lens group 10.

By satisfying condition (1), an increase in diameter of the most-object side lens element (i.e., the negative first sub-lens element 11) is prevented especially in the case where the focal length of the zoom lens system at the short focal length extremity is made shorter, and the correcting of aberrations can suitably be made.

The second sub-lens element 12 is not designed to secure refractive power, rather, is mainly designed to correct off-axis aberrations at the short focal length extremity via the aspherical surface thereof, and only has a weak negative refractive power. Therefore the second sub-lens element 12 is preferably made from resin by which an aspherical surface can easily be formed.

If $(ra-rb)/(ra+rb)$ exceeds the lower limit of condition (1), the amount of convexity of the object-side surface of the second sub-lens element 12 becomes larger. Consequently, the diameter of the most object-side lens element (the first sub-lens element 11) increases. If an attempt is made to forcibly reduce the diameter of the most object-side lens element, the off-axis optical performance at the short focal length extremity deteriorates.

If $(ra-rb)/(ra+rb)$ exceeds the upper limit of condition (1), the refractive power of the second sub-lens element 12 becomes undesirably strong in the case where a resin lens is employed, since focusing fluctuations occur due to temperature changes In a digital camera optical system which uses a solid-state image sensor such as a CCD, etc., telecentricity is required; however, this requirement is disadvantageous when miniaturization of the optical system is required. In order to reduce the length of the entire optical system while maintaining telecentricity, it is necessary to determine suitable refractive power arrangements for each lens group and to determine a suitable lens arrangement.

In the present invention, the height of a bundle of the off-axis light rays from the optical axis at the short focal length extremity is increased by forming the most image-side surface of the positive second lens group 20 (i.e., the most image-side surface of the sixth sub-lens element 23) as a concave divergent surface; and both telecentricity of the zoom lens system and the reduction in length thereof are achieved by refracting a bundle of light rays by the positive third lens group 30 having a relatively strong refractive power so that the bundle of light rays is parallel to the optical axis.

Condition (2) determines the refractive power of the positive third lens group 30 with respect to the positive second lens group 20. By satisfying condition (2), the off-axis light rays emitted from the most image-side surface of the positive second lens group 20 (i.e., the sixth sub-lens element 23) is made parallel to the optical axis via the positive refractive power of the positive third lens group 30. Namely, condition (2) is for providing telecentricity via the positive third lens group 30.

If f2/f3 exceeds the lower limit of condition (2), the positive refractive power of the positive third lens group 30 becomes weak, so that it becomes difficult to achieve miniaturization while maintaining telecentricity.

If f2/f3 exceeds the upper limit of condition (2), the positive refractive power of the positive third lens group 30 becomes too strong and the change in optical performance according to close distances upon focusing undesirably increases.

Furthermore, the fourth sub-lens element 21 of the positive second lens group 20 preferably satisfies condition (3) in order to suitably correct chromatic aberrations throughout the entire zooming range of the zoom lens system.

In the zoom lens system, zooming is performed by moving each lens group along the optical axis; and therefore it is necessary to correct to chromatic aberration occurs in each lens group to a certain extent.

Especially in the case where the zoom ratio is increased, the amount of aberration fluctuations caused by the movement of the second lens group 20 in the optical axis direction upon zooming also increase, so that it becomes necessary to reduce this amount of aberration fluctuations. If a glass lens element having an Abbe number which does not satisfy condition (3) is used, it becomes difficult to suitably correct chromatic aberration. It is more preferably to satisfy the following condition:

$$v2\text{-}1 > 70 \tag{3'}$$

Condition (4) determines the image-forming magnification ratio of the positive second lens group 20 at the long focal length extremity to the image-forming magnification ratio thereof at the short focal length extremity.

Condition (5) determines the image-forming magnification ratio of the third lens group 30 at the long focal length extremity to the image-forming magnification ratio thereof at the short focal length extremity.

Conditions (4) and (5) are for preventing an increase of the size of the zoom lens system as much as possible by appropriately determining the refractive power and traveling distance along the optical axis of the positive second lens group 20 and the positive third lens group 30 when the zoom ratio of the zoom lens system is increased.

The positive second lens group 20 increases the magnification of the zoom lens system by moving toward the object from the short focal length extremity to the long focal length extremity.

If m2t/m2w exceeds the lower limit of condition (4), there is only a little increase in the image-forming magnification of the positive second lens group 20 from the short focal length extremity to the long focal length extremity, so that it becomes difficult to achieve a desired zoom ratio.

If m2t/m2w exceeds the upper limit of condition (4), the increase in the image-forming magnification of the positive second lens group 20 becomes too large, so that the traveling distance of the positive second lens group 20 upon zooming increases. Consequently, it becomes difficult to miniaturize the zoom lens system. If the refractive power of the positive second lens group 20 is increased, and if the traveling distance of the positive second lens group 20 upon zooming is made shorter, miniaturization of the zoom lens system becomes possible; however, it becomes difficult to correct aberrations over the entire zooming range from the short focal length extremity to the long focal length extremity, so that a suitable optical performance cannot be achieved.

The positive third lens group 30 increases the magnification of the zoom lens system by moving towards the image from the shot focal length extremity to the long focal length extremity.

If m3t/m3w exceeds the lower limit of condition (5), there is only a little amount of increase in the image-forming magnification of the positive third lens group 30 from the short focal length extremity to the long focal length extremity, so that it becomes difficult to achieve a desired zoom ratio, or the burden of zooming on the positive second lens group 20 increases.

If m3t/m3w exceeds the upper limit of condition (5), the traveling distance of the positive third lens group 30 along the optical axis increases. Consequently, it is necessary to make the positive refractive power of the positive third lens group 30 stronger in order to prevent a lack of the back focal distance at the long focal length extremity. However, as a result, it becomes difficult to reduce the change in field curvature at the long focal length extremity when an object at close distance is taken (photographed).

Condition (6) determines the Abbe number of the d-line with respect to third sub-lens element 13. By satisfying condition (6), more suitable optical performance can be attained.

If v1-3 exceeds condition (6), lateral chromatic aberration at the short focal length extremity is undercorrected, which deteriorates the imaging quality of the zoom lens system.

Both lens surfaces of the fourth sub-lens element 21 are preferably made aspherical.

Even one aspherical surface of the fourth sub-lens element 21 can correct spherical aberration and coma throughout the entire zooming range. Furthermore, by forming both surfaces of the fourth sub-lens element 21 aspherical, the burden on the correcting of aberrations is distributed over these surfaces, so that the occurrence of aberrations on each of these aspherical surfaces is reduced. Consequently, sensitivity to optical performance deterioration caused by decentration of lens elements during assembly can be made smaller.

In the zoom lens system of the present invention, the positive third lens group 30 performs focusing. The third lens group 30 is arranged to be moved along the optical axis with respect to a close-distance object in order to achieve an infocus state. The positive third lens group 30 can be formed from a positive resin biconvex single lens element so as to achieve a reduced cost. Furthermore, by forming at least one lens surface of the positive third lens group 30 (single biconvex lens 31) as an aspherical surface, it becomes possible to reduce deterioration of optical performance during focusing toward an object at a close distance.

Specific numerical embodiments will be herein discussed.

In the diagrams of chromatic aberration (axial chromatic aberration) represented by spherical aberration, the solid line and the two types of dotted lines respectively indicate spherical aberrations with respect to the d, g and C lines.

Also, in the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, F$_{NO}$ designates the f-number, f designates the focal length of the entire zoom lens system, W designates the half angle-of-view (°), fB designates the back focal distance (the distance from the image-side surface of the most image-side cover glass to the image plane), r designates the radius of curvature, d designates the lens-element thickness or distance between lens elements, Nd designates the refractive index of the d-line, and νd designates the Abbe number.

The values for the distance "d" d which are variable according to F$_{NO}$ designates, f, W, fB and zooming are indicated in the order of the short focal length extremity, an intermediate focal length and the long focal length extremity.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 1

Figure 1:
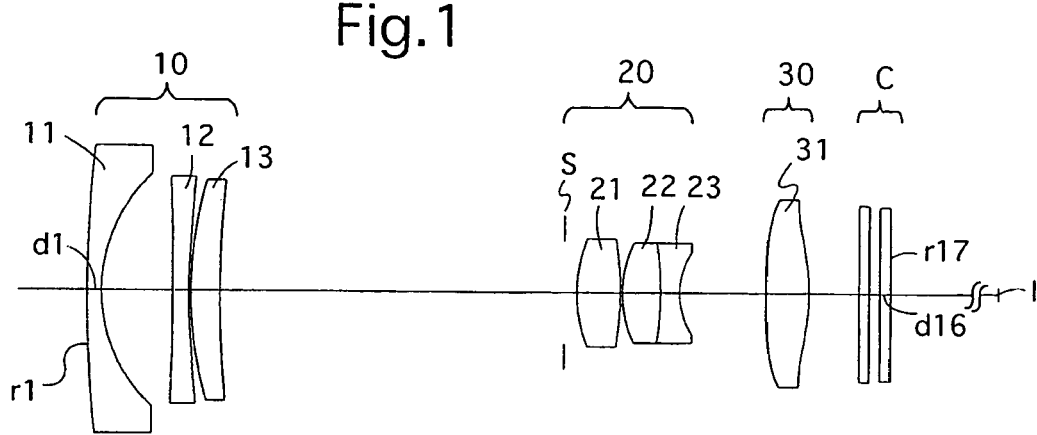
FIG. 1 shows a lens arrangement of a first embodiment of the zoom lens system according to the present invention.
Figure 2A:
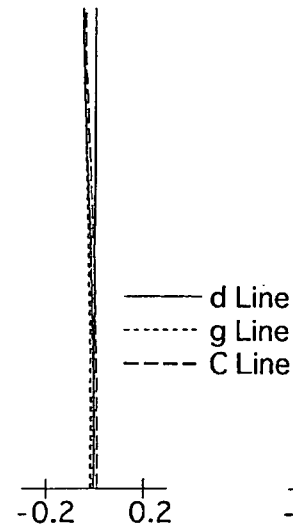
FIGS. 2A, 2B, 2C and 2D show aberrations occurred in the lens arrangement shown in FIG. 1 at the short focal length extremity when an object at infinity is photographed.
Figure 2B:
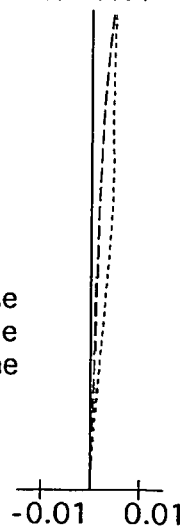
Figure 2C:
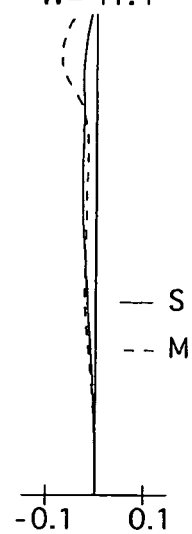
Figure 2D:
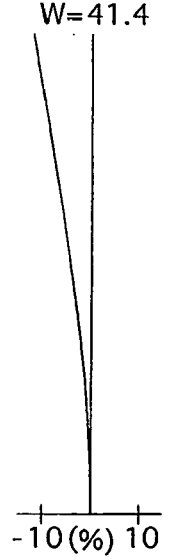
Figure 3A:
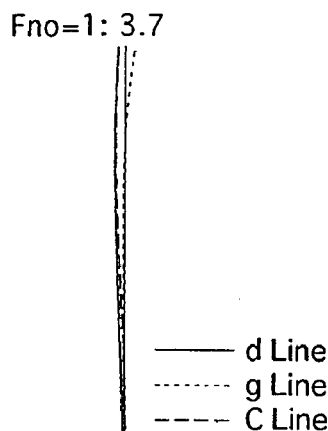
FIGS. 3A, 3B, 3C and 3D show aberrations occurred in the lens arrangement shown in FIG. 1 at an intermediate focal length when an object at infinity is photographed.
Figure 3B:
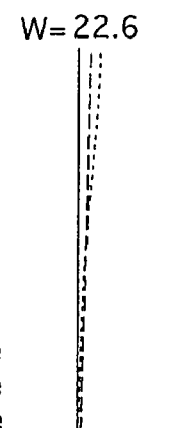
Figure 3C:
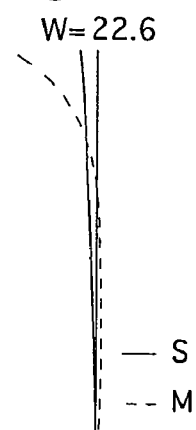
Figure 3D:
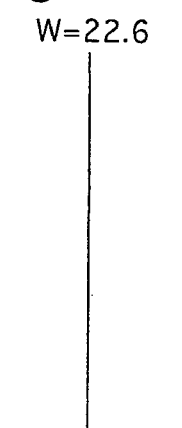
Figure 4A:
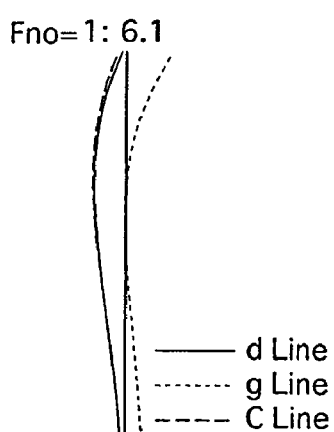
FIGS. 4A, 4B, 4C and 4D show aberrations occurred in the lens arrangement shown in FIG. 1 at the long focal length extremity when an object at infinity is photographed.
Figure 4B:
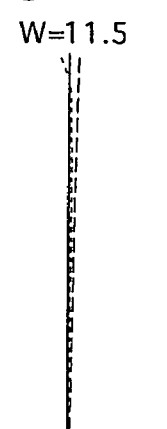
Figure 4C:
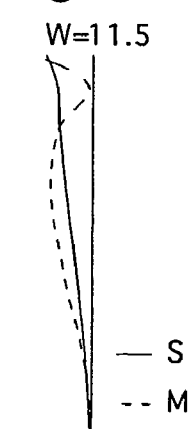
Figure 4D:
Figure 15A:
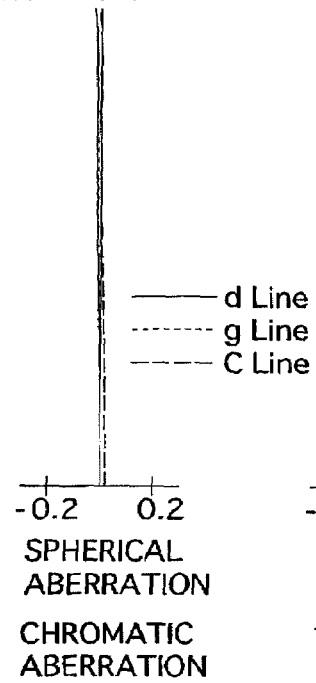
FIGS. 15A, 15B, 15C and 15D show aberrations occurred in the lens arrangement shown in FIG. 13 at an intermediate focal length when an object at infinity is photographed.
Figure 15B:
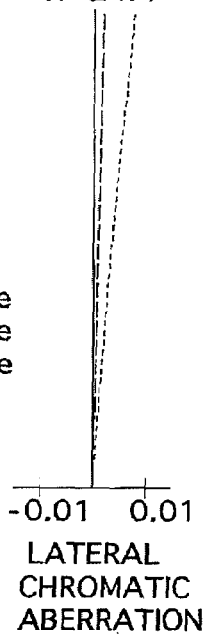
Figure 15C:
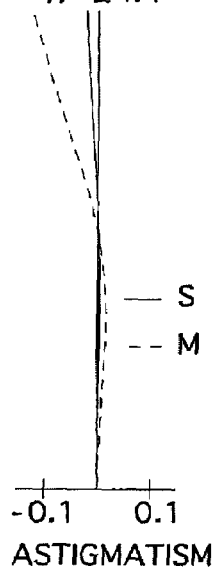
Figure 15D:
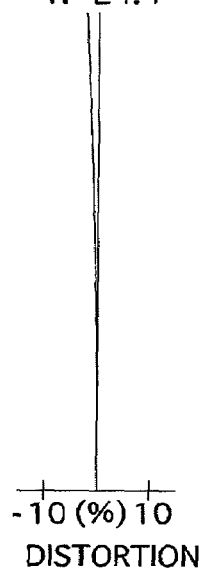
Figure 16A:
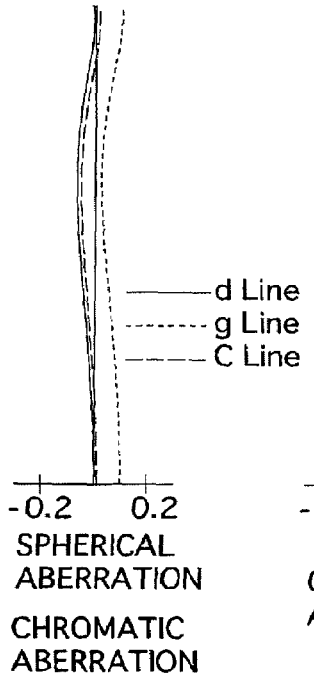
FIGS. 16A, 16B, 16C and 16D show aberrations occurred in the lens arrangement shown in FIG. 13 at the long focal length extremity when an object at infinity is photographed.
Figure 16B:
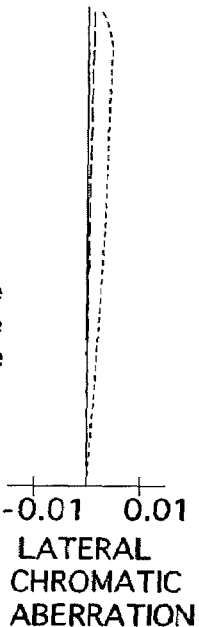
Figure 16C:
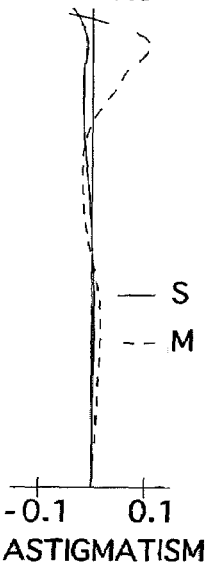
Figure 16D:
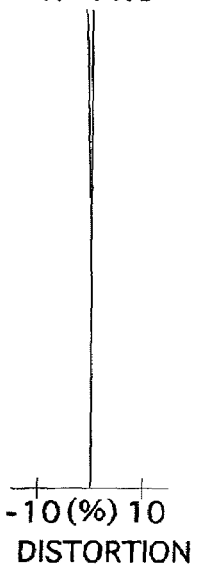
Figure 19A:
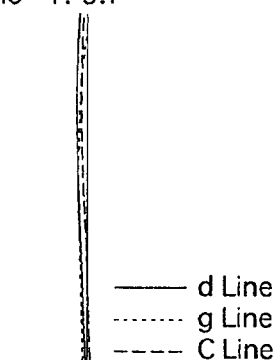
FIGS. 19A, 19B, 19C and 19D show aberrations occurred in the lens arrangement shown in FIG. 17 at an intermediate focal length when an object at infinity is photographed.
Figure 19B:
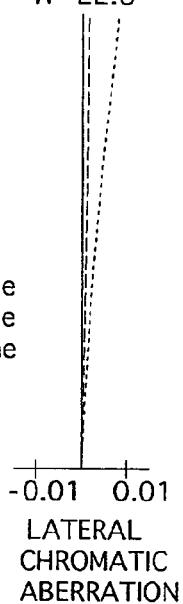
Figure 19C:
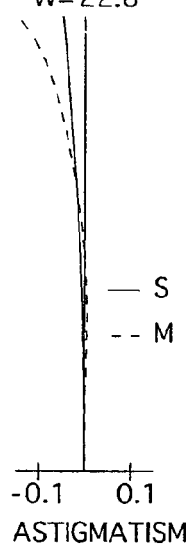
Figure 19D:
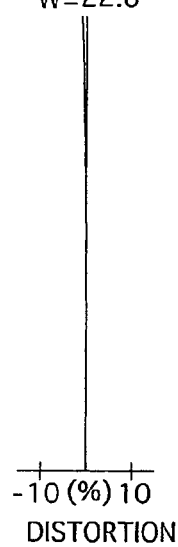
Figure 20A:
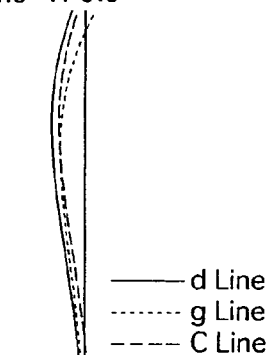
FIGS. 20A, 20B, 20C and 20D show aberrations occurred in the lens arrangement shown in FIG. 17 at the long focal length extremity when an object at infinity is photographed.
Figure 20B:
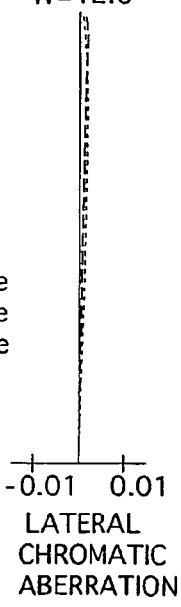
Figure 20C:
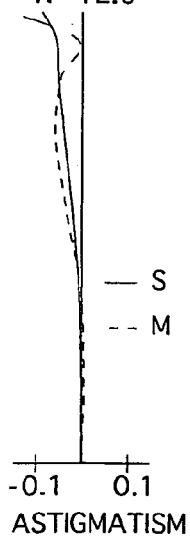
Figure 20D:
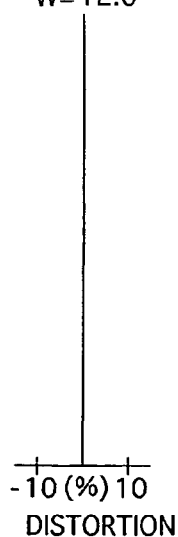

FIG. 1 shows the lens arrangement of the first embodiment of the zoom lens system according to the present invention.

FIGS. 2A through 2D show aberrations occurred in the lens arrangement shown in FIG. 1 at the short focal length extremity when an object at infinity is photographed.

FIGS. 3A through 3D show aberrations occurred in the lens arrangement shown in FIG. 1 at an intermediate focal length when an object at infinity is photographed.

FIGS. 4A through 4D show aberrations occurred in the lens arrangement shown in FIG. 1 at the long focal length extremity when an object at infinity is photographed.

Table 1 shows the numerical data of the first embodiment.

The negative first lens group 10 (surface Nos. 1 through 6) includes a negative meniscus lens element (first sub-lens element) 11 having the convex surface facing toward the object, a meniscus lens element (second sub-lens element) 12 which has a weak negative refractive power, has an aspherical surface on each surface thereof, and is formed from resin, and a positive meniscus lens element (third sub-lens element) 13 having the convex surface facing toward the object, in this order from the object.

The positive second lens group 20 (surface Nos. 7 through 11) includes a biconvex lens element (fourth sub-lens element) 21 formed from resin and having an aspherical surface on each surface, a biconvex positive lens element (fifth sub-lens element) 22 and a biconcave negative lens element (sixth sub-lens element) 23, in this order from the object. The biconvex positive lens element 22 and the biconcave negative lens element 23 are cemented to each other.

The positive third lens group 30 (surface Nos. 12 and 13) includes a biconvex positive lens element 31 formed from resin and having an aspherical surface on each surface.

Surface Nos. 14 through 17 designate a cover glass (filter group) C positioned in front of an imaging device.

A diaphragm S is provided 0.600 in front (on the object side) of the positive second lens group 20 (surface No. 7).

TABLE 1

FNO. = 1:2.6-3.7-6.1
f = 5.00-9.80-20.04
W = 41.4-22.6-11.5
fB = 0.59-0.59-0.59

| Surf. No. | r | d | Nd | ν |
|---|---|---|---|---|
| 1 | 62.312 | 0.70 | 1.77250 | 49.6 |
| 2 | 7.598 | 3.38 | | |
| 3* | 73.041 | 0.80 | 1.54358 | 55.7 |
| 4* | 20.704 | 0.10 | | |
| 5 | 18.876 | 1.40 | 1.92286 | 18.9 |
| 6 | 50.960 | 17.02-7.06-1.83 | | |
| 7* | 6.688 | 2.10 | 1.49700 | 81.6 |
| 8* | −15.776 | 0.10 | | |
| 9 | 5.620 | 1.80 | 1.75700 | 47.8 |
| 10 | −14.180 | 0.90 | 1.80610 | 33.3 |
| 11 | 3.484 | 4.17-9.83-20.87 | | |
| 12* | 33.208 | 2.00 | 1.54358 | 55.7 |
| 13* | −11.311 | 2.43-2.09-1.20 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.0 | −0.12295 × 10$^{-2}$ | 0.48935 × 10$^{-4}$ | −0.60367 × 10$^{-6}$ |
| 4 | −1.0 | −0.13418 × 10$^{-2}$ | 0.52036 × 10$^{-4}$ | −0.76764 × 10$^{-6}$ |
| 7 | −1.0 | 0.13222 × 10$^{-4}$ | 0.13088 × 10$^{-4}$ | −0.12846 × 10$^{-5}$ |
| 8 | −1.0 | 0.12167 × 10$^{-3}$ | 0.14282 × 10$^{-4}$ | −0.15874 × 10$^{-5}$ |
| 12 | −1.0 | −0.84756 × 10$^{-4}$ | 0.48311 × 10$^{-4}$ | −0.44751 × 10$^{-6}$ |
| 13 | −1.0 | 0.24053 × 10$^{-3}$ | 0.34834 × 10$^{-4}$ | 0.80658 × 10$^{-6}$ |

| Surf. No. | A10 |
|---|---|
| 4 | 0.92200 × 10$^{-9}$ |
| 13 | −0.32142 × 10$^{-7}$ |

The symbol * designates the aspherical surface which is rotationally symmetrical with respect to the optical axis.

Embodiment 2

FIG. 5 shows the lens arrangement of the second embodiment of the zoom lens system according to the present invention.

FIGS. 6A through 6D show aberrations occurred in the lens arrangement shown in FIG. 5 at the short focal length extremity when an object at infinity is photographed.

FIGS. 7A through 7D show aberrations occurred in the lens arrangement shown in FIG. 5 at an intermediate focal length when an object at infinity is photographed.

FIGS. 8A through 8D show aberrations occurred in the lens arrangement shown in FIG. 5 at the long focal length extremity when an object at infinity is photographed.

Table 2 shows the numerical data of the second embodiment.

The basic lens arrangement of the second embodiment is the same as that of the first embodiment.

The diaphragm S is provided 0.600 in front of (on the object side) the second lens group 20 (surface No. 7).

TABLE 2

FNO. = 1:2.6-3.7-6.1
f = 5.00-9.80-20.00
W = 42.0-22.9-11.5
fB = 0.59-0.59-0.59

| Surf. No. | r | d | Nd | ν |
|---|---|---|---|---|
| 1 | 47.746 | 0.70 | 1.83481 | 42.7 |
| 2 | 7.228 | 3.25 | | |
| 3* | 122.138 | 0.80 | 1.52538 | 56.3 |
| 4* | 17.567 | 0.10 | | |
| 5 | 20.355 | 1.40 | 1.92286 | 18.9 |
| 6 | 153.831 | 16.46-6.98-1.93 | | |
| 7* | 7.612 | 2.10 | 1.48749 | 70.2 |
| 8* | −14.548 | 0.10 | | |
| 9 | 5.034 | 1.80 | 1.75700 | 47.8 |
| 10 | −9.244 | 0.90 | 1.80610 | 33.3 |
| 11 | 3.347 | 4.43-10.28-21.75 | | |
| 12* | 23.098 | 2.00 | 1.54358 | 55.7 |
| 13* | −15.713 | 2.42-2.08-1.40 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.0 | $-0.12427 \times 10^{-2}$ | $0.47297 \times 10^{-4}$ | $-0.59826 \times 10^{-6}$ |
| 4 | −1.0 | $-0.13841 \times 10^{-2}$ | $0.51363 \times 10^{-4}$ | $-0.80877 \times 10^{-6}$ |
| 7 | −1.0 | $0.33563 \times 10^{-4}$ | $0.10440 \times 10^{-4}$ | $-0.18565 \times 10^{-5}$ |
| 8 | −1.0 | $0.95556 \times 10^{-4}$ | $0.89799 \times 10^{-5}$ | $-0.21914 \times 10^{-5}$ |
| 12 | −1.0 | $-0.11761 \times 10^{-3}$ | $0.53847 \times 10^{-4}$ | $-0.19107 \times 10^{-5}$ |
| 13 | −1.0 | $0.26787 \times 10^{-3}$ | $0.20924 \times 10^{-4}$ | |

| Surf. No. | A10 |
|---|---|
| 4 | $0.12108 \times 10^{-8}$ |
| 8 | $0.39014 \times 10^{-7}$ |

The symbol * designates the aspherical surface which is rotationally symmetrical with respect to the optical axis.

Embodiment 3

FIG. 9 shows the lens arrangement of the third embodiment of the zoom lens system according to the present invention.

FIGS. 10A through 10D show aberrations occurred in the lens arrangement shown in FIG. 9 at the short focal length extremity when an object at infinity is photographed.

FIGS. 11A through 11D show aberrations occurred in the lens arrangement shown in FIG. 9 at an intermediate focal length when an object at infinity is photographed.

FIGS. 12A through 12D show aberrations occurred in the lens arrangement shown in FIG. 9 at the long focal length extremity when an object at infinity is photographed.

Table 3 shows the numerical data of the third embodiment.

The basic lens arrangement of the third embodiment is the same as that of the first embodiment.

The diaphragm S is provided 0.600 in front of (on the object side) the second lens group 20 (surface No. 7).

TABLE 3

FNO. = 1:2.6-3.7-6.1
f = 5.00-9.80-20.00
W = 42.0-22.9-11.5
fB = 0.59-0.59-0.59

| Surf. No. | r | d | Nd | ν |
|---|---|---|---|---|
| 1 | 47.394 | 0.70 | 1.80400 | 46.6 |
| 2 | 7.400 | 3.38 | | |
| 3* | 223.682 | 0.80 | 1.54358 | 55.7 |
| 4* | 16.967 | 0.10 | | |
| 5 | 19.406 | 1.40 | 1.92286 | 21.3 |
| 6 | 137.807 | 17.01-7.31-2.11 | | |
| 7* | 6.990 | 2.10 | 1.48749 | 70.2 |
| 8* | −15.633 | 0.10 | | |
| 9 | 5.387 | 1.80 | 1.75700 | 47.8 |
| 10 | −9.999 | 0.90 | 1.80610 | 33.3 |
| 11 | 3.470 | 4.00-10.06-21.62 | | |
| 12* | 20.574 | 2.00 | 1.54358 | 55.7 |
| 13* | −17.565 | 2.74-2.28-1.40 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.0 | $-0.12323 \times 10^{-2}$ | $0.48364 \times 10^{-4}$ | $-0.60286 \times 10^{-6}$ |
| 4 | −1.0 | $-0.13532 \times 10^{-2}$ | $0.52526 \times 10^{-4}$ | $-0.77701 \times 10^{-6}$ |
| 7 | −1.0 | $0.46934 \times 10^{-4}$ | $0.11922 \times 10^{-4}$ | $-0.15609 \times 10^{-5}$ |
| 8 | −1.0 | $0.11327 \times 10^{-3}$ | $0.11977 \times 10^{-4}$ | $-0.19142 \times 10^{-5}$ |
| 12 | −1.0 | $-0.57587 \times 10^{-4}$ | $0.53800 \times 10^{-4}$ | $-0.16353 \times 10^{-5}$ |
| 13 | −1.0 | $0.22116 \times 10^{-3}$ | $0.29557 \times 10^{-4}$ | |

| Surf. No. | A10 |
|---|---|
| 4 | $0.56087 \times 10^{-9}$ |
| 12 | $0.34332 \times 10^{-7}$ |

The symbol * designates the aspherical surface which is rotationally symmetrical with respect to the optical axis.

Embodiment 4

FIG. 13 shows the lens arrangement of the fourth embodiment of the zoom lens system according to the present invention.

FIGS. 14A through 14D show aberrations occurred in the lens arrangement shown in FIG. 13 at the short focal length extremity when an object at infinity is photographed.

FIGS. 15A through 15D show aberrations occurred in the lens arrangement shown in FIG. 13 at an intermediate focal length when an object at infinity is photographed.

FIGS. 16A through 16D show aberrations occurred in the lens arrangement shown in FIG. 13 at the long focal length extremity when an object at infinity is photographed.

Table 4 shows the numerical data of the fourth embodiment.

The basic lens arrangement of the fourth embodiment is the same as that of the first embodiment.

The diaphragm S is provided 0.600 in front of (on the object side) the second lens group 20 (surface No. 7).

TABLE 4

FNO. = 1:2.6-3.5-5.9
f = 5.10-9.17-19.70
W = 40.5-24.4-11.8
fB = 0.59-0.59-0.59

| Surf. No. | r | d | Nd | ν |
|---|---|---|---|---|
| 1 | 40.762 | 0.70 | 1.77250 | 49.6 |
| 2 | 6.964 | 3.00 | | |
| 3* | 58.372 | 0.80 | 1.54358 | 55.7 |
| 4* | 27.330 | 0.10 | | |
| 5 | 15.729 | 1.40 | 1.94595 | 18.0 |
| 6 | 27.891 | 17.77-8.37-2.36 | | |
| 7* | 6.173 | 1.98 | 1.58989 | 66.8 |
| 8* | −19.384 | 0.10 | | |
| 9 | 7.016 | 1.72 | 1.77250 | 49.6 |
| 10 | −12.396 | 1.00 | 1.80610 | 33.3 |
| 11 | 3.537 | 3.73-8.09-19.15 | | |
| 12* | 32.790 | 2.00 | 1.54358 | 55.7 |
| 13* | −13.104 | 2.52-2.40-1.40 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.0 | $-0.12253 \times 10^{-2}$ | $0.49370 \times 10^{-4}$ | $-0.65575 \times 10^{-6}$ |
| 4 | −1.0 | $-0.13716 \times 10^{-2}$ | $0.51331 \times 10^{-4}$ | $-0.79703 \times 10^{-6}$ |
| 7 | −1.0 | $0.13698 \times 10^{-5}$ | $0.96980 \times 10^{-5}$ | $-0.83521 \times 10^{-6}$ |
| 8 | −1.0 | $0.14378 \times 10^{-3}$ | $0.13208 \times 10^{-4}$ | $-0.14593 \times 10^{-5}$ |
| 12 | −1.0 | $-0.15810 \times 10^{-3}$ | $0.38927 \times 10^{-4}$ | $-0.11704 \times 10^{-5}$ |
| 13 | −1.0 | $0.32188 \times 10^{-4}$ | $0.11336 \times 10^{-4}$ | $0.67536 \times 10^{-6}$ |

| Surf. No. | A10 |
|---|---|
| 4 | $-0.23075 \times 10^{-9}$ |
| 12 | $0.84406 \times 10^{-8}$ |
| 13 | $-0.33338 \times 10^{-7}$ |

The symbol * designates the aspherical surface which is rotationally symmetrical with respect to the optical axis.

TABLE 5

FNO. = 1:2.6-3.7-5.9
f = 5.01-9.80-19.30
W = 41.3-22.8-12.0
fB = 0.59-0.59-0.59

| Surf. No. | r | d | Nd | ν |
|---|---|---|---|---|
| 1 | 49.757 | 0.70 | 1.77250 | 49.6 |
| 2 | 7.334 | 3.31 | | |
| 3* | 342.560 | 0.80 | 1.54358 | 55.7 |
| 4* | 24.928 | 0.10 | | |
| 5 | 19.159 | 1.40 | 1.92286 | 18.9 |
| 6 | 57.522 | 17.11-7.31-2.05 | | |
| 7* | 6.314 | 2.10 | 1.48749 | 70.2 |
| 8* | −15.433 | 0.10 | | |
| 9 | 5.920 | 1.80 | 1.77250 | 49.6 |
| 10 | −13.346 | 0.90 | 1.80610 | 33.3 |
| 11 | 3.502 | 4.08-9.91-20.07 | | |
| 12* | 30.458 | 2.00 | 1.54358 | 55.7 |
| 13* | −12.239 | 2.49-1.98-1.40 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.0 | $-0.12328 \times 10^{-2}$ | $0.49196 \times 10^{-4}$ | $-0.61129 \times 10^{-6}$ |
| 4 | −1.0 | $-0.13424 \times 10^{-2}$ | $0.51891 \times 10^{-4}$ | $-0.78426 \times 10^{-6}$ |
| 7 | −1.0 | $0.13758 \times 10^{-5}$ | $0.12745 \times 10^{-4}$ | $-0.97795 \times 10^{-6}$ |
| 8 | −1.0 | $0.13378 \times 10^{-3}$ | $0.16080 \times 10^{-4}$ | $-0.13847 \times 10^{-5}$ |
| 12 | −1.0 | $-0.31294 \times 10^{-4}$ | $0.43480 \times 10^{-4}$ | $-0.87106 \times 10^{-6}$ |
| 13 | −1.0 | $0.22250 \times 10^{-3}$ | $0.32313 \times 10^{-4}$ | $-0.15637 \times 10^{-6}$ |

| Surf. No. | A10 |
|---|---|
| 4 | $0.11619 \times 10^{-8}$ |
| 12 | $0.22679 \times 10^{-7}$ |
| 13 | $0.11000 \times 10^{-7}$ |

The symbol * designates the aspherical surface which is rotationally symmetrical with respect to the optical axis.

Embodiment 5

FIG. 17 shows the lens arrangement of the fifth embodiment of the zoom lens system according to the present invention.

FIGS. 18A through 18D show aberrations occurred in the lens arrangement shown in FIG. 17 at the short focal length extremity when an object at infinity is photographed.

FIGS. 19A through 19D show aberrations occurred in the lens arrangement shown in FIG. 17 at an intermediate focal length when an object at infinity is photographed.

FIGS. 20A through 20D show aberrations occurred in the lens arrangement shown in FIG. 17 at the long focal length extremity when an object at infinity is photographed.

Table 5 shows the numerical data of the fifth embodiment.

The basic lens arrangement of the fifth embodiment is the same as that of the first embodiment.

The diaphragm S is provided 0.600 in front of (on the object side) the second lens group 20 (surface No. 7).

Embodiment 6

Figure 21:
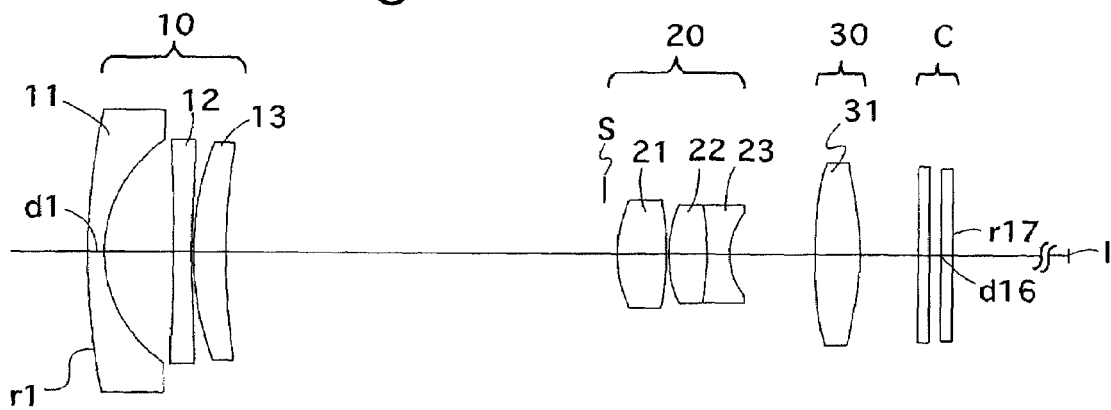
FIG. 21 shows a lens arrangement of a sixth embodiment of the zoom lens system according to the present invention.
Figure 22A:
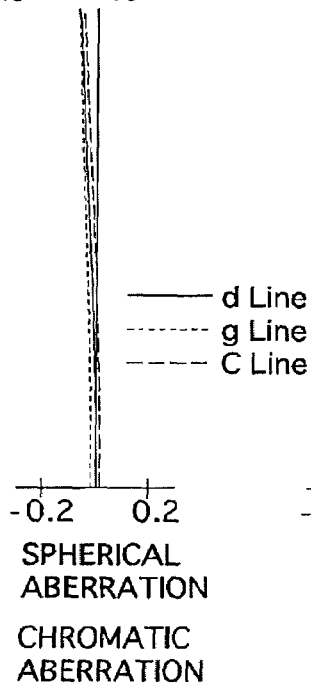
FIGS. 22A, 22B, 22C and 22D show aberrations occurred in the lens arrangement shown in FIG. 21 at the short focal length extremity when an object at infinity is photographed.
Figure 22B:
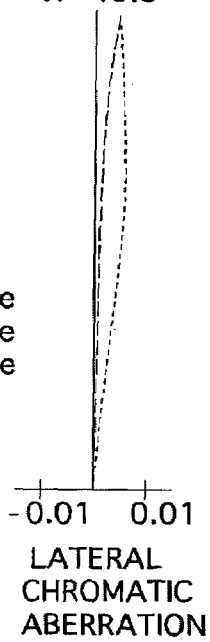
Figure 22C:
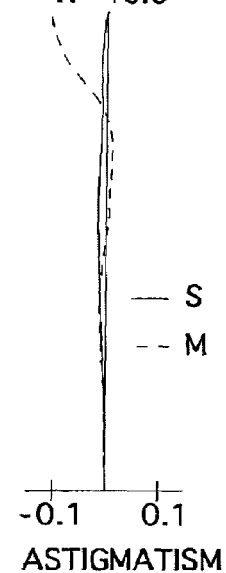
Figure 22D:
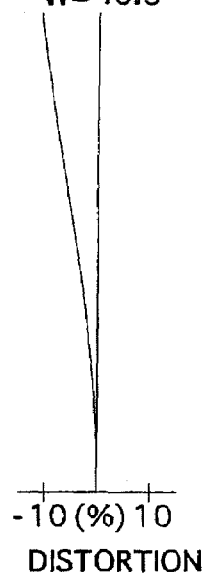

FIG. 21 shows the lens arrangement of the sixth embodiment of the zoom lens system according to the present invention.

FIGS. 22A through 22D show aberrations occurred in the lens arrangement shown in FIG. 21 at the short focal length extremity when an object at infinity is photographed.

FIGS. 23A through 23D show aberrations occurred in the lens arrangement shown in FIG. 21 at an intermediate focal length when an object at infinity is photographed.

FIGS. 24A through 24D show aberrations occurred in the lens arrangement shown in FIG. 21 at the long focal length extremity when an object at infinity is photographed.

Table 6 shows the numerical data of the sixth embodiment.

The basic lens arrangement of the sixth embodiment is the same as that of the first embodiment.

The diaphragm S is provided 0.600 in front of (on the object side) the second lens group 20 (surface No. 7).

TABLE 6

FNO. = 1:2.6-3.6-5.9
f = 5.10-9.11-19.70
W = 40.5-24.7-11.8
fB = 0.59-0.59-0.59

| Surf. No. | r | d | Nd | ν |
|---|---|---|---|---|
| 1 | 37.577 | 0.70 | 1.77250 | 49.6 |
| 2 | 6.955 | 3.05 | | |
| 3* | 92.459 | 0.80 | 1.54358 | 55.7 |
| 4* | 25.183 | 0.10 | | |
| 5 | 16.569 | 1.40 | 1.92286 | 18.9 |
| 6 | 35.468 | 17.37-8.57-2.15 | | |
| 7* | 6.225 | 2.17 | 1.52500 | 70.6 |
| 8* | −15.760 | 0.10 | | |
| 9 | 6.469 | 1.70 | 1.77250 | 49.6 |
| 10 | −14.444 | 1.00 | 1.80610 | 33.3 |
| 11 | 3.558 | 3.79-8.64-19.52 | | |
| 12* | 28.764 | 2.00 | 1.54358 | 55.7 |
| 13* | −13.721 | 2.55-1.99-1.40 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

Aspherical surface data (the aspherical surface coefficients not indicated are zero (0.00)):

| Surf. No. | K | A4 | A6 | A8 |
|---|---|---|---|---|
| 3 | −1.0 | $-0.12271 \times 10^{-2}$ | $0.49395 \times 10^{-4}$ | $-0.62497 \times 10^{-6}$ |
| 4 | −1.0 | $-0.13508 \times 10^{-2}$ | $0.51684 \times 10^{-4}$ | $-0.79935 \times 10^{-6}$ |
| 7 | −1.0 | $-0.10773 \times 10^{-4}$ | $0.85317 \times 10^{-5}$ | $-0.10729 \times 10^{-5}$ |
| 8 | −1.0 | $0.14803 \times 10^{-3}$ | $0.12663 \times 10^{-4}$ | $-0.16805 \times 10^{-5}$ |
| 12 | −1.0 | $-0.19371 \times 10^{-4}$ | $0.43670 \times 10^{-4}$ | $-0.18640 \times 10^{-5}$ |
| 13 | −1.0 | $0.12726 \times 10^{-3}$ | $0.30702 \times 10^{-4}$ | $-0.10506 \times 10^{-5}$ |

| Surf. No. | A10 |
|---|---|
| 4 | $0.40661 \times 10^{-9}$ |
| 12 | $0.37838 \times 10^{-7}$ |
| 13 | $0.18519 \times 10^{-7}$ |

The symbol * designates the aspherical surface which is rotationally symmetrical with respect to the optical axis.

Embodiment 7

Figure 25:
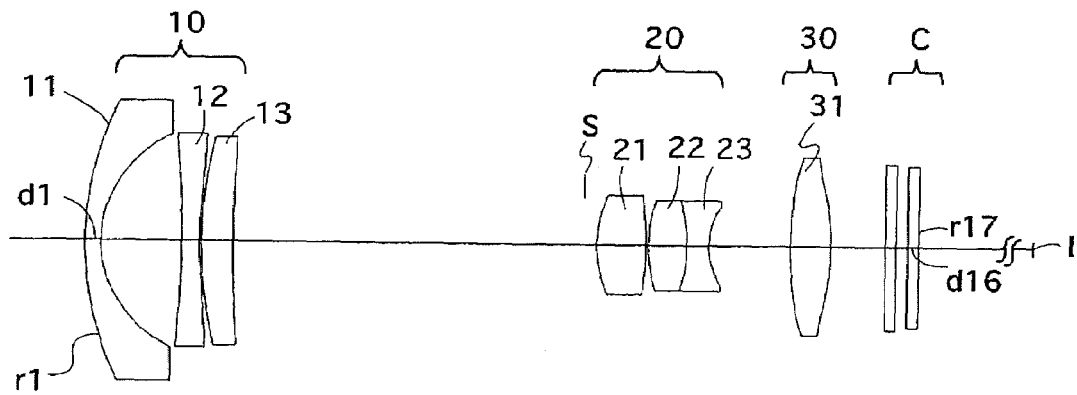
FIG. 25 shows a lens arrangement of a seventh embodiment of the zoom lens system according to the present invention.
Figure 26A:
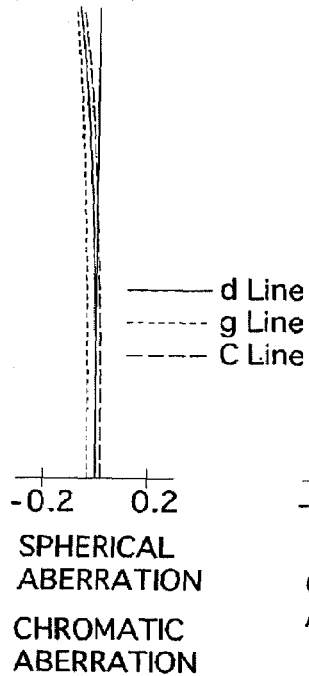
FIGS. 26A, 26B, 26C and 26D show aberrations occurred in the lens arrangement shown in FIG. 25 at the short focal length extremity when an object at infinity is photographed.
Figure 26B:
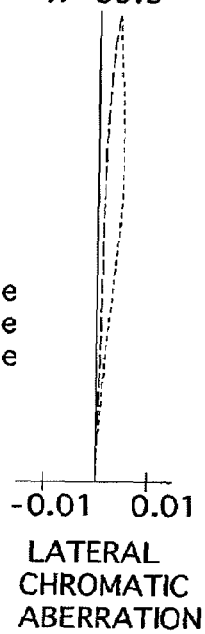
Figure 26C:
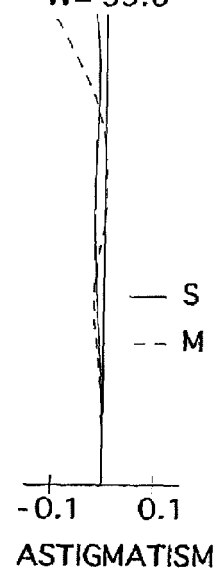
Figure 26D:
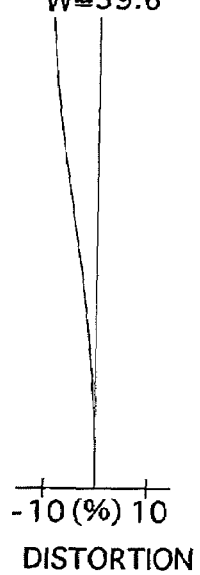

FIG. 25 shows the lens arrangement of the seventh embodiment of the zoom lens system according to the present invention.

FIGS. 26A through 26D show aberrations occurred in the lens arrangement shown in FIG. 25 at the short focal length extremity when an object at infinity is photographed.

FIGS. 27A through 27D show aberrations occurred in the lens arrangement shown in FIG. 25 at an intermediate focal length when an object at infinity is photographed.

FIGS. 28A through 28D show aberrations occurred in the lens arrangement shown in FIG. 25 at the long focal length extremity when an object at infinity is photographed.

Table 7 shows the numerical data of the seventh embodiment.

The basic lens arrangement of the seventh embodiment is the same as that of the first embodiment.

The diaphragm S is provided 0.600 in front of (on the object side) the second lens group 20 (surface No. 7).

TABLE 7

FNO. = 1:2.6-3.7-5.8
f = 4.74-9.20-18.00
W = 39.6-23.1-12.2
fB = 0.59-0.59-0.59

| Surf. No. | r | d | Nd | ν |
|---|---|---|---|---|
| 1 | 16.808 | 0.70 | 1.77250 | 49.6 |
| 2 | 6.033 | 3.61 | | |
| 3* | 57.705 | 0.80 | 1.54358 | 55.7 |
| 4* | 14.322 | 0.10 | | |
| 5 | 22.364 | 1.40 | 1.94595 | 18.0 |
| 6 | 79.708 | 16.38 | 7.12 | 2.37 |
| 7* | 6.445 | 2.19 | 1.58989 | 66.8 |
| 8* | −17.226 | 0.10 | | |
| 9 | 7.599 | 1.73 | 1.80400 | 46.6 |
| 10 | −8.392 | 1.00 | 1.80610 | 33.3 |
| 11 | 3.779 | 3.68-9.10-18.85 | | |
| 12* | 23.045 | 1.80 | 1.54358 | 55.7 |
| 13* | −13.320 | 2.41-2.04-1.20 | | |
| 14 | ∞ | 0.50 | 1.51633 | 64.1 |
| 15 | ∞ | 0.51 | | |
| 16 | ∞ | 0.50 | 1.51633 | 64.1 |
| 17 | ∞ | — | | |

The symbol * designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 3 | −1.0 | $-0.22996 \times 10^{-2}$ | $0.10119 \times 10^{-3}$ | $-0.14081 \times 10^{-5}$ |
| 4 | −1.0 | $-0.25663 \times 10^{-2}$ | $0.11319 \times 10^{-3}$ | $-0.19374 \times 10^{-5}$ |
| 7 | −1.0 | $-0.78146 \times 10^{-4}$ | $0.24662 \times 10^{-4}$ | $-0.49952 \times 10^{-6}$ |
| 8 | −1.0 | $0.16441 \times 10^{-3}$ | $0.36186 \times 10^{-4}$ | $-0.17121 \times 10^{-5}$ |
| 12 | −1.0 | $-0.38466 \times 10^{-6}$ | $0.56899 \times 10^{-5}$ | $0.50147 \times 10^{-6}$ |
| 13 | −1.0 | $0.26043 \times 10^{-3}$ | $-0.20930 \times 10^{-4}$ | $0.21761 \times 10^{-5}$ |

| Surf. No. | A10 |
|---|---|
| 4 | $0.14461 \times 10^{-8}$ |
| 12 | $0.44400 \times 10^{-8}$ |
| 13 | $-0.31442 \times 10^{-7}$ |

The numerical values of each condition for each embodiment are shown in Table 8.

TABLE 8

| | Cond. (1) | Cond. (2) | Cond. (3) | Cond. (4) | Cond. (5) | Cond. (6) |
|---|---|---|---|---|---|---|
| Embod. 1 | 0.558 | 0.685 | 81.6 | 3.615 | 1.109 | 18.9 |
| Embod. 2 | 0.749 | 0.611 | 70.2 | 3.709 | 1.079 | 18.9 |
| Embod. 3 | 0.859 | 0.617 | 70.2 | 3.613 | 1.107 | 21.3 |
| Embod. 4 | 0.362 | 0.609 | 66.8 | 3.549 | 1.087 | 18.0 |
| Embod. 5 | 0.864 | 0.662 | 70.2 | 3.525 | 1.094 | 18.9 |
| Embod. 6 | 0.572 | 0.616 | 70.6 | 3.537 | 1.092 | 18.9 |
| Embod. 7 | 0.602 | 0.651 | 66.8 | 3.429 | 1.107 | 18.0 |

As can be understood from Table 8, the first through seventh embodiments satisfy conditions (1) through (5). Furthermore, as can be understood from the aberration diagrams, the various aberrations are suitably corrected.

According to the present invention, a negative-lead type zoom lens system, which includes three lens groups, and has a zoom ratio of approximately 4 can suitably correct aberrations, and can cover a zooming range from the wide-angle extremity (the short focal length extremity) to the telephoto extremity (the long focal length extremity), can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a positive second lens group, and a positive third lens group, in this order from an object,
wherein upon zooming from the short focal length extremity to the long focal length extremity, each of said negative first lens group, said positive second lens group and said positive third lens group moves along the optical axis;
wherein said negative first lens group comprises a negative first sub-lens element, a second sub-lens element having a weak negative refractive power and at least one aspherical surface, and a positive third sub-lens element, in this order from the object; and
wherein said zoom lens system satisfies the following condition:

$0.5 < (ra-rb)/(ra+rb) < 1.2$ wherein
ra designates the radius of curvature of the object-side surface of said second sub-lens element of said negative first lens group; and
rb designates the radius of curvature of the image-side surface of said second sub-lens element of said negative first lens group; and
said negative first lens group satisfies the following condition:

$v1-3 < 22$ wherein
v1-3 designates the Abbe number of said positive third sub-lens element of said negative first lens group.

2. The zoom lens system according to claim 1, wherein said positive third lens group comprises a biconvex lens element of resin, and functions as a focusing lens group.

3. An electronic imaging apparatus comprising an imaging device on which an image is formed by the zoom lens system according to claim 1.

4. A zoom lens system comprises a negative first lens group, a positive second lens group, and a positive third lens group, in this order from an object,
wherein upon zooming from the short focal length extremity to the long focal length extremity, said negative first lens group first moves toward an image, and thereafter moves toward the object, said positive second lens group moves monotonically toward the object, and said positive third lens group moves monotonically toward the image;
said negative first lens group comprises a negative first sub-lens element, a second sub-lens element having a weak negative refractive power and at least one aspherical surface, and a positive third sub-lens element, in this order from the object;
wherein said zoom lens system satisfies the following condition:

$0.5 < f2/f3 < 0.9$ wherein
f2 designates the focal length of said positive second lens group; and
f3 designates the focal length of said positive third lens group; and wherein said negative first lens group satisfies the following condition:

$v1-3 < 22$ wherein
v1-3 designates the Abbe number of said positive third sub-lens element of said negative first lens group.

5. The zoom lens system according to claim 4, wherein said positive third lens group comprises a biconvex lens element of resin, and functions as a focusing lens group.

6. An electronic imaging apparatus comprising an imaging device on which an image is formed by the zoom lens system according to claim 4.

7. A zoom lens system comprises a negative first lens group, a positive second lens group, and a positive third lens group, in this order from an object,
wherein upon zooming from the short focal length extremity to the long focal length extremity, each of said negative first lens group, said positive second lens group and said positive third lens group moves along the optical axis;
wherein said negative first lens group comprises a negative first sub-lens element, a second sub-lens element having a weak negative refractive power and at least one aspherical surface, and a positive third sub-lens element, in this order from the object;
wherein said positive second lens group comprises a positive fourth sub-lens element having at least one aspherical surface, a positive fifth sub-lens element, and a negative sixth sub-lens element, in this order from the object; and wherein said zoom lens system satisfies the following condition:

$v2-1 > 60$ wherein v2-1 designates the Abbe number of said positive fourth sub-lens element of said positive second lens group; and
wherein said negative first lens group satisfies the following condition:

$v1-3 < 22$ wherein v1-3 designates the Abbe number of said positive third sub-lens element of said negative first lens group.

8. The zoom lens system according to claim 7, wherein said positive third lens group comprises a biconvex lens element of resin, and functions as a focusing lens group.

9. An electronic imaging apparatus comprising an imaging device on which an image is formed by the zoom lens system according to claim 7.

10. A zoom lens system comprises a negative first lens group, a positive second lens group, and a positive third lens group, in this order from an object,
wherein upon zooming from the short focal length extremity to the long focal length extremity, each of said negative first lens group, said positive second lens group and said positive third lens group moves along the optical axis;
wherein said negative first lens group comprises a negative first sub-lens element, a second sub-lens element having a weak negative refractive power and at least one aspherical surface, and a positive third sub-lens element, in this order from the object;
wherein, upon zooming from the short focal length extremity to the long focal length extremity, said positive second lens group moves monotonically toward the object, and said positive third lens group moves monotonically toward the image; and wherein said zoom lens system satisfies the following condition:

$$3.2 < m2t/m2w < 4.0$$

$$1.05 < m3t/m3w < 1.4$$

wherein m2t designates the image-forming magnification of said positive second lens group at the long focal length extremity when the object at infinity is in an in-focus state;

m2w designates the image-forming magnification of said positive second lens group at the short focal length extremity when the object at infinity is in an in-focus state;

m3t designates the image-forming magnification of said positive third lens group at the long focal length extremity when the object at infinity is in an in-focus state; and m3w designates the image-forming magnification of said positive third lens group at the short focal length extremity when the object at infinity is in an in-focus state; and wherein said negative first lens group satisfies the following condition:

$$v1-3 < 22$$

wherein v1-3 designates the Abbe number of said positive third sub-lens element of said negative first lens group.

11. The zoom lens system according to claim 10, wherein said negative first lens group comprises a negative first sub-lens element, a second sub-lens element having a negative and weak refractive power and at least one aspherical surface, and a positive third sub-lens element, in this order from the object; and wherein said second sub-lens element satisfies the following condition:

$$0.5 < (ra-rb)/(ra+rb) < 1.2$$

wherein ra designates the radius of curvature of the object-side surface of said second sub-lens element of said negative first lens group; and rb designates the radius of curvature of the image-side surface of said second sub-lens element of said negative first lens group.

12. The zoom lens system according to claim 10, wherein said zoom lens system satisfies the following condition:

$$0.5 < f2/f3 < 0.9$$

wherein f2 designates the focal length of said positive second lens group; and f3 designates the focal length of said positive third lens group.

13. The zoom lens system according to claim 10, wherein said positive second lens group comprises a positive fourth sub-lens element that is aspherical on both lens surfaces.

14. The zoom lens system according to claim 10, wherein said positive third lens group comprises a biconvex lens element of resin, and functions as a focusing lens group.

15. An electronic imaging apparatus comprising an imaging device on which an image is formed by the zoom lens system according to claim 10.

* * * * *